US012559334B2

(12) United States Patent
Azami

(10) Patent No.: US 12,559,334 B2

(45) Date of Patent: Feb. 24, 2026

(54) IMAGE FORMING APPARATUS

(71) Applicant: CANON KABUSHIKI KAISHA, Tokyo (JP)

(72) Inventor: Junya Azami, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/753,048

(22) Filed: Jun. 25, 2024

(65) Prior Publication Data

US 2025/0002281 A1 Jan. 2, 2025

(30) Foreign Application Priority Data

Jun. 29, 2023 (JP) ................................ 2023-107146

(51) Int. Cl.

*B65H 5/26* (2006.01)
*G03G 15/00* (2006.01)
*G03G 21/00* (2006.01)

(52) U.S. Cl.

CPC .......... *B65H 5/26* (2013.01); *G03G 15/6502* (2013.01); *G03G 15/6558* (2013.01); *G03G 21/00* (2013.01); *B65H 2301/5115* (2013.01); *B65H 2404/60* (2013.01); *B65H 2407/21* (2013.01); *G03G 15/6514* (2013.01); *G03G 2215/00607* (2013.01)

(58) Field of Classification Search

CPC ......... G03G 21/00; G03G 2215/00607; G03G 15/6514; G03G 2215/00392; G03G 15/6502; G03G 15/6558; B65H 2301/5115; B65H 5/26; B65H 2407/21; B65H 2405/324; B65H 2404/60

See application file for complete search history.

(56) References Cited

U.S. PATENT DOCUMENTS

| | | | | |
|---|---|---|---|---|
| 5,779,235 | A * | 7/1998 | Nakamura | B65H 3/44 271/9.12 |
| 7,149,455 | B2 | 12/2006 | Hattori | |
| 9,487,367 | B2 * | 11/2016 | Otsuki | B65H 9/006 |
| 10,928,765 | B2 | 2/2021 | Suzuki | |
| 11,442,387 | B2 | 9/2022 | Suzuki | |
| 11,822,276 | B2 | 11/2023 | Suzuki | |
| 2005/0019073 | A1 | 1/2005 | Hattori | |

FOREIGN PATENT DOCUMENTS

| | | |
|---|---|---|
| JP | 2005-041652 A | 2/2005 |
| JP | 2007-091383 A | 4/2007 |

* cited by examiner

*Primary Examiner* — Jeremy R Severson

(74) *Attorney, Agent, or Firm* — Venable LLP

(57) ABSTRACT

An image forming apparatus includes a first sheet feeding portion, a second sheet feeding portion, an image forming portion, a paper dust collecting portion, a merging portion, a rotatable member, a first guiding member, and a second guiding member. The paper dust collecting portion is provided downstream of the first sheet feeding portion and the second sheet feeding portion and upstream of the merging portion with respect to a conveying direction of a recording material.

18 Claims, 12 Drawing Sheets

(a)

(b)

(a)

(b)

IMAGE FORMING APPARATUS

FIELD OF THE INVENTION AND RELATED ART

The present invention relates to an image forming apparatus, such as a laser printer, using electrophotography.

The image forming apparatus such as the laser printer includes a plurality of sheet feeding portions, such as a sheet feeding cassette and a multi-purpose tray, on which recording materials for printing are stacked in a laminated form and includes a separation pad or a separation roller as a separating means for separating upward a sheet (recording material) on one end side of the sheet feeding portion. In such an image forming apparatus, a sheet surface receives stress by friction between sheets with separation of the sheets or a frictional force received from the separating means, or the like, so that a paper dust (paper powder) amount on the sheet partially increases. When such paper dust is mixed into toner in a process of image formation, a problem such that a lowering in image quality is caused has arisen. For that reason, a constitution is proposed in which a paper dust collecting roller having the substantially same width as a width of the separating means is provided on a side downstream of the separating means with respect to a sheet conveying direction of each sheet feeding portion and in which the paper dust generated on the sheet is removed in a period until the sheet is conveyed to an image forming portion (for example, Japanese Laid-Open Patent Application No. 2005-041652).

However, in the conventional example, for each of the plurality of sheet feeding portions, there is a need to dispose a dedicated paper dust collecting roller. For example, in the image forming apparatus of the conventional example, a contact surface of the separation pad (hereinafter, this contact surface is referred to as a "separation surface side") is different between a sheet fed from the sheet feeding tray and a sheet fed from the multi-purpose tray. For this reason, there is a need to dispose the dedicated paper dust collecting roller for collecting the paper dust in contact with the separation surface side of the sheet fed from each of the sheet feeding portions. For this reason, there arises a problem such that a space for permitting arrangement of the paper dust collecting roller and its accompanying parts is needed at a plurality of places and thus the image forming apparatus is upsized. Further, in order to efficiently collect the paper dust, there is a need to prepare the paper dust collecting roller with a resin material high in charging performance, for example, a fluorine-containing resin. However, such a material is expensive, and when the number of the paper dust collecting rollers is increased, there is a problem such that a part cost of the image forming apparatus increases.

SUMMARY OF THE INVENTION

The present invention has accomplished in such a situation.

A principal object of the present invention is to provide an image forming apparatus capable of effectively removing paper dust for a plurality of sheet feeding portions without causing upsizing and an increase in cost of the image forming apparatus.

In order to solve the problem, according to an aspect of the present invention, there is provided an image forming apparatus comprising: a first sheet feeding portion on which a first recording material is placed; a second sheet feeding portion on which a second recording material is placed and which is different from the first sheet feeding portion; an image forming portion configured to form an image on the first recording material or the second recording material; a collecting portion configured to collect first paper powder deposited on the first recording material and second paper powder deposited on the second recording material; a merging portion where a first path and a second path cross each other, the first path being a path along which the first recording material is conveyed until the first recording material reaches the image forming portion and the second path being a path along which the second recording material is conveyed until the second recording material reaches the image forming portion; a rotatable member configured to collect the first paper dust while rotating in a first direction in contact with the first recording material when the first recording material is fed and configured to collect the second paper dust while rotating in a second direction opposite to the first direction in contact with the second recording material when the second recording material is fed; a first guiding member opposing the rotatable member and forming a part of the first path in cooperation with the rotatable member; and a second guiding member opposing the rotatable member and forming a part of the second path in cooperation with the rotatable member, wherein the collecting portion is provided downstream of the first sheet feeding portion and the second sheet feeding portion and upstream of the merging portion with respect to a conveying direction of the recording material.

According to another aspect of the present invention, there is provided an image forming apparatus comprising: a first sheet feeding portion on which a first recording material is placed; and a second sheet feeding portion on which a second recording material is placed; an image forming portion configured to form an image on the first recording material or the second recording material; a conveying portion including a first rotatable member contacting print surfaces of the first recording material and the second recording material and a second rotatable member forming a nip in cooperation with the first rotatable member, wherein the conveying portion conveys the first recording material and the second recording material to the image forming portion while nipping the first recording material and the second recording material between the first rotatable member and the second rotatable member, and a merging portion where a first path and a second path cross each other, the first path being a path along which the first recording material is conveyed until the first recording material reaches the image forming portion and the second path being a path along which the second recording material is conveyed until the second recording material reaches the image forming portion, wherein the conveying portion includes a charging member contacting the first rotatable member and configured to electrically charge the first rotatable member by friction when the first rotatable member rotates, wherein the conveying portion is provided downstream of the merging portion and upstream of the image forming portion with respect to a recording material conveying direction, and wherein the first rotatable member causes paper dust to be adsorbed thereon by an electrostatic force generated by being charged by the charging member.

Further features of the present invention will become apparent from the following description of exemplary embodiments with reference to the attached drawings.

Figure 2:
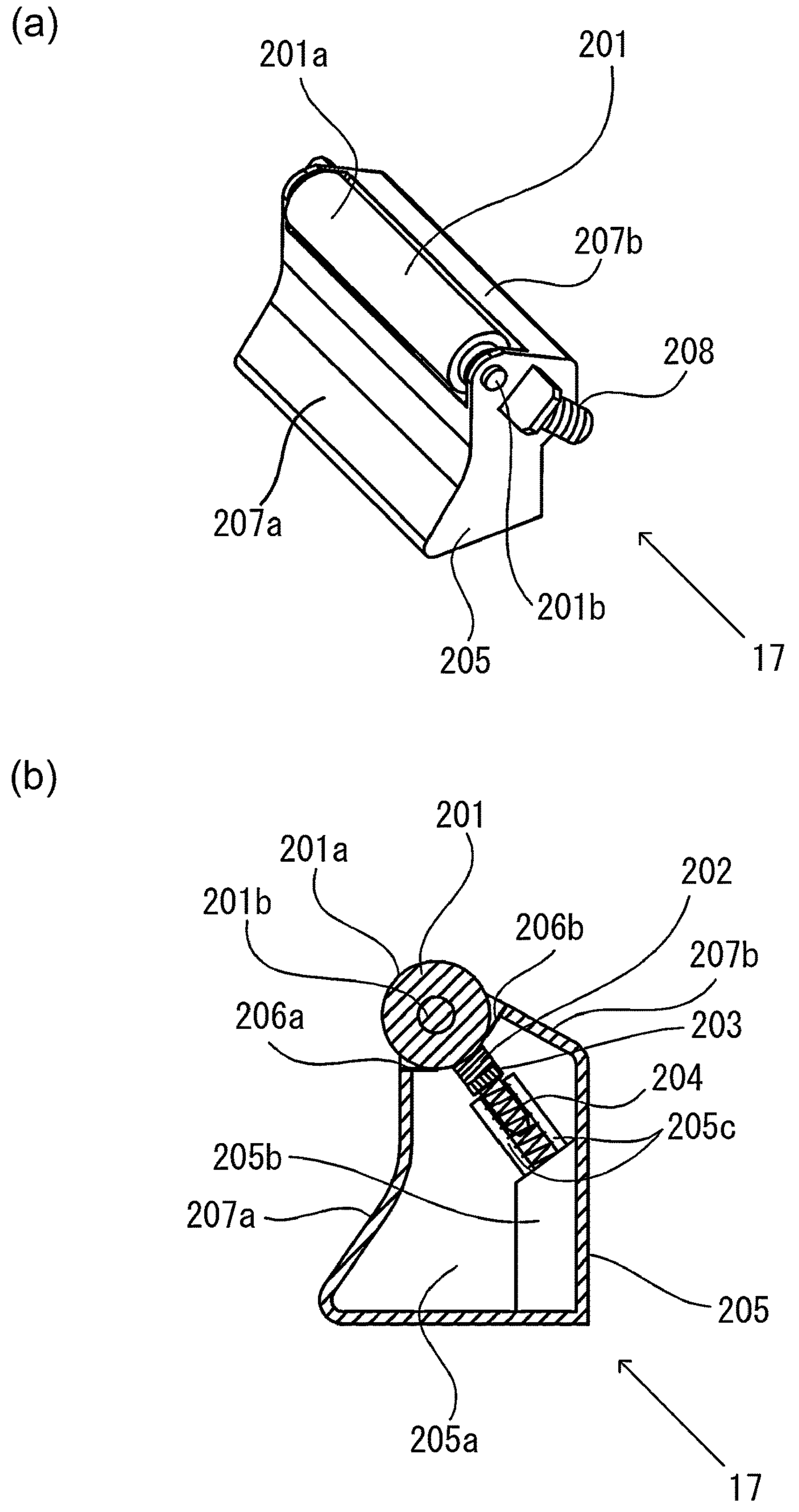

Parts (a) and (b) of FIG. 2 are schematic views each showing a paper dust collecting unit in the embodiment 1.

Figure 3:
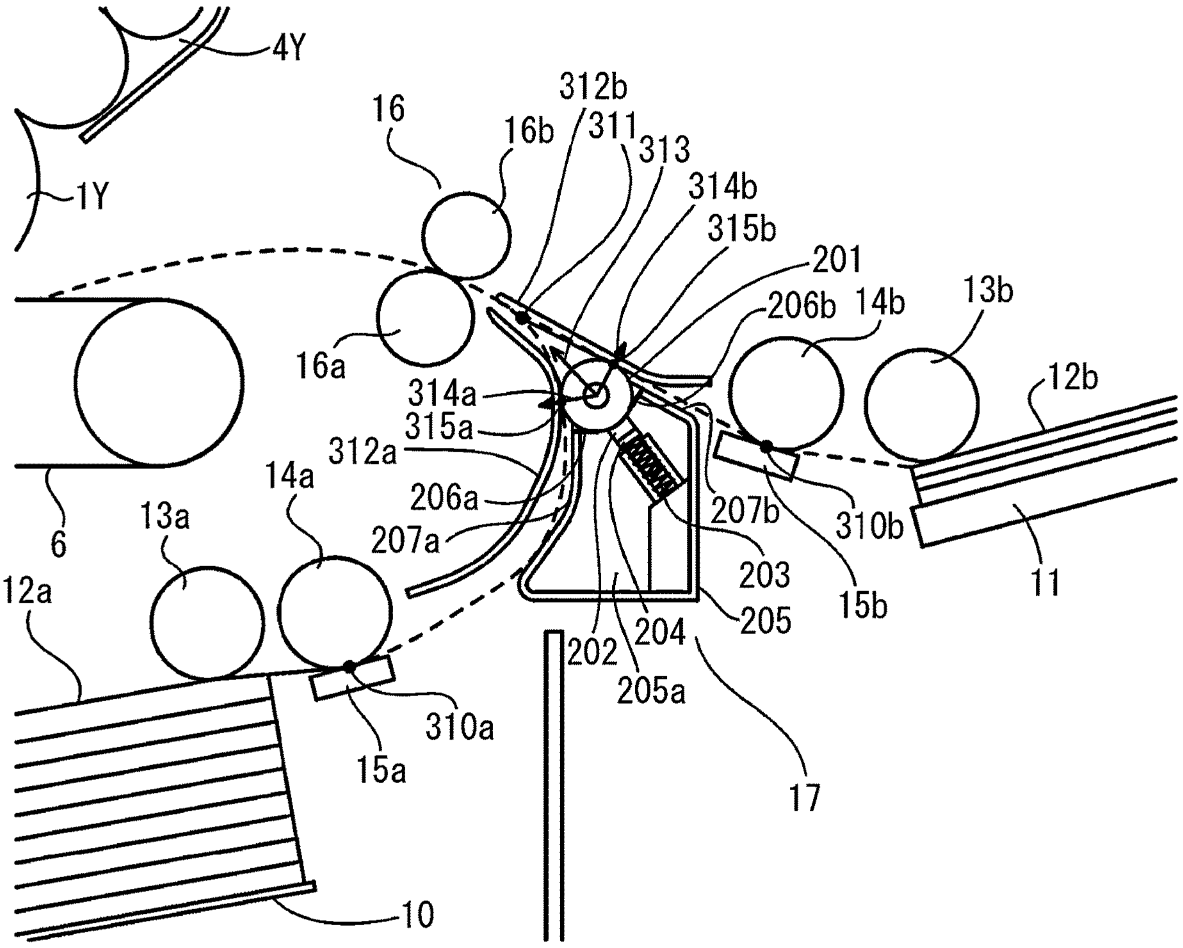

FIG. 3 is a sectional view showing a sheet feeding operation in the embodiment 1.

Figure 4:
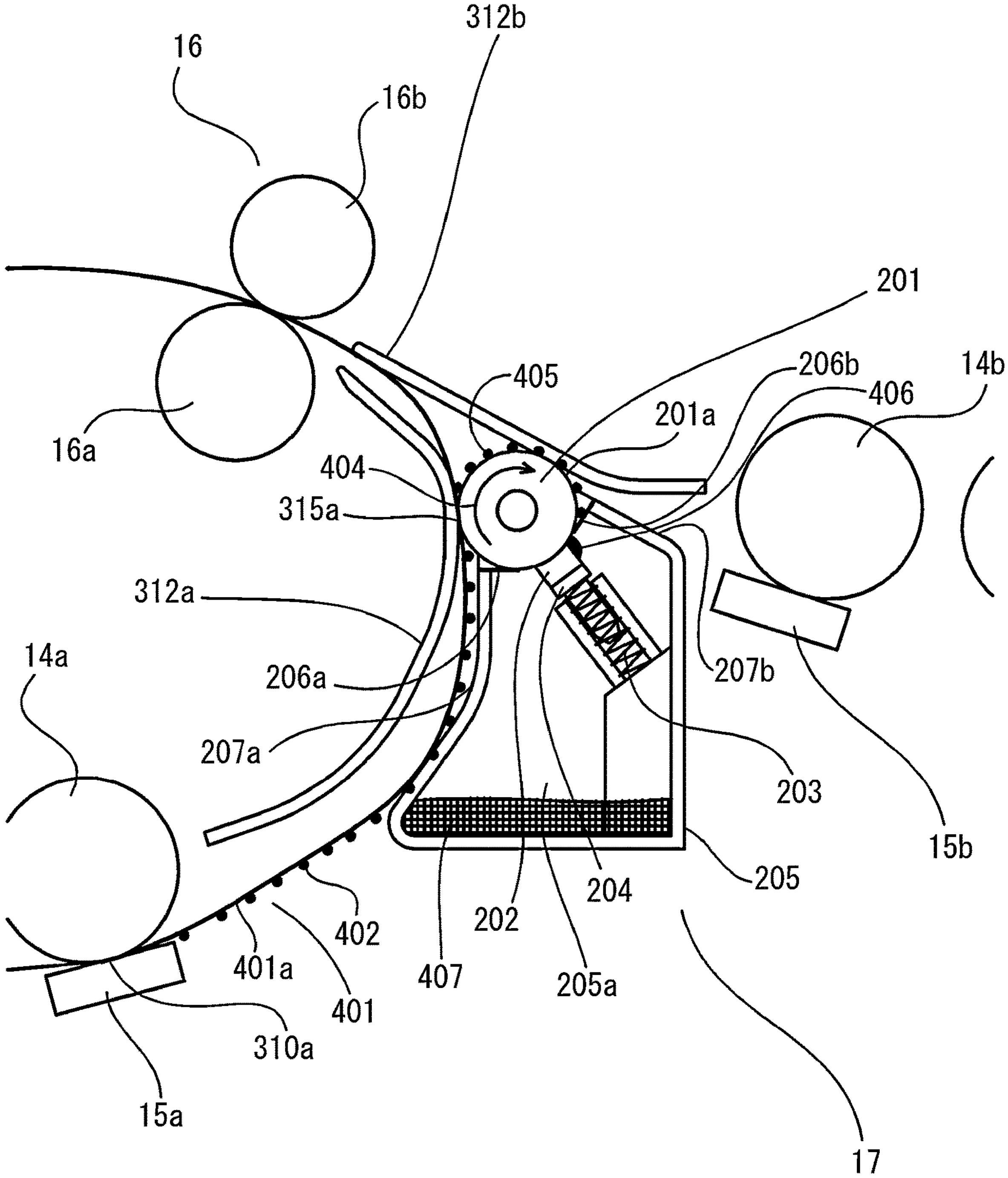

FIG. 4 is a schematic view for illustrating a paper dust collecting operation from a sheet feeding cassette in the embodiment 1.

Figure 5:
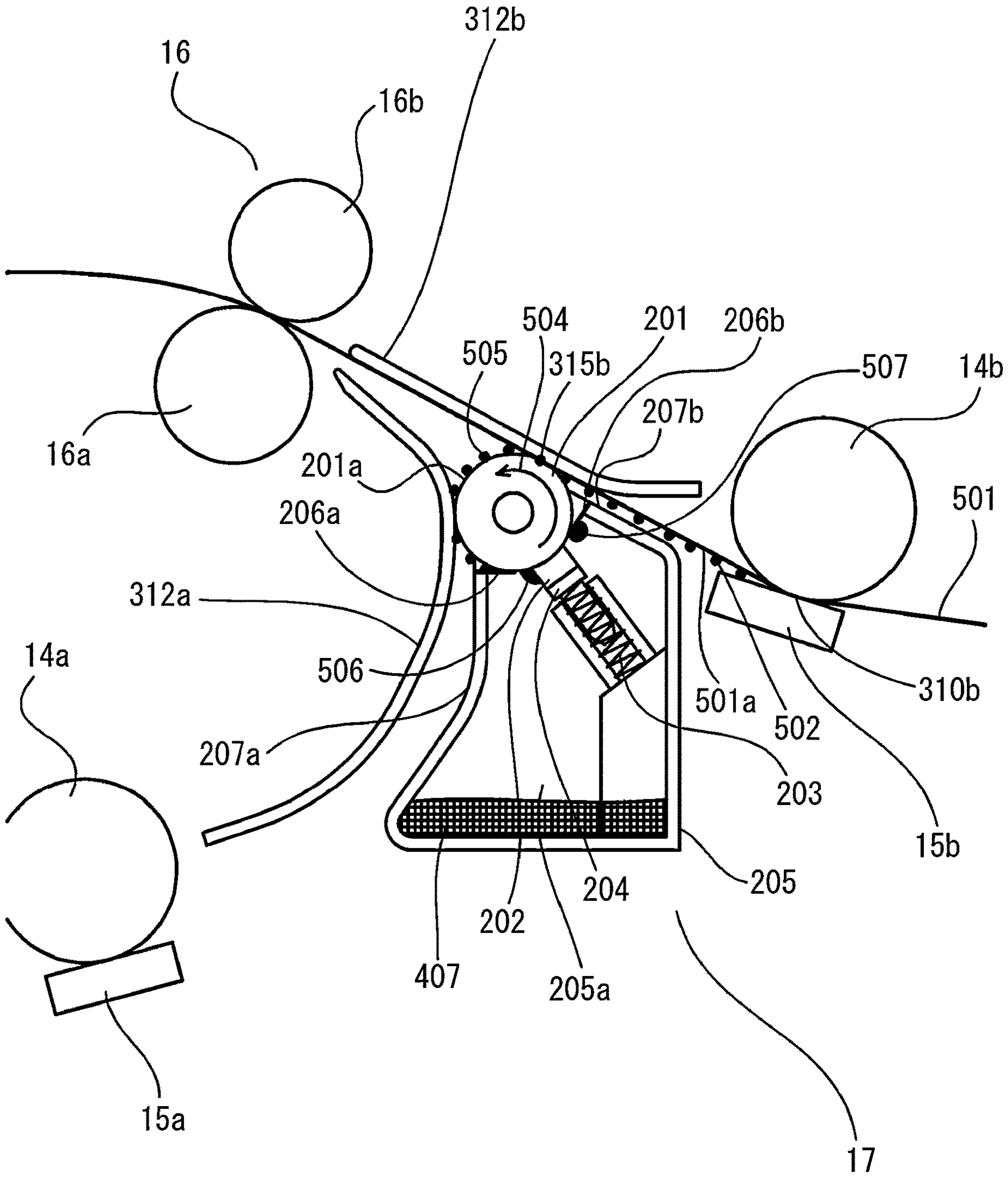

FIG. 5 is a schematic view for illustrating a paper dust collecting operation from a multi-tray in the embodiment 1.

Figure 6:
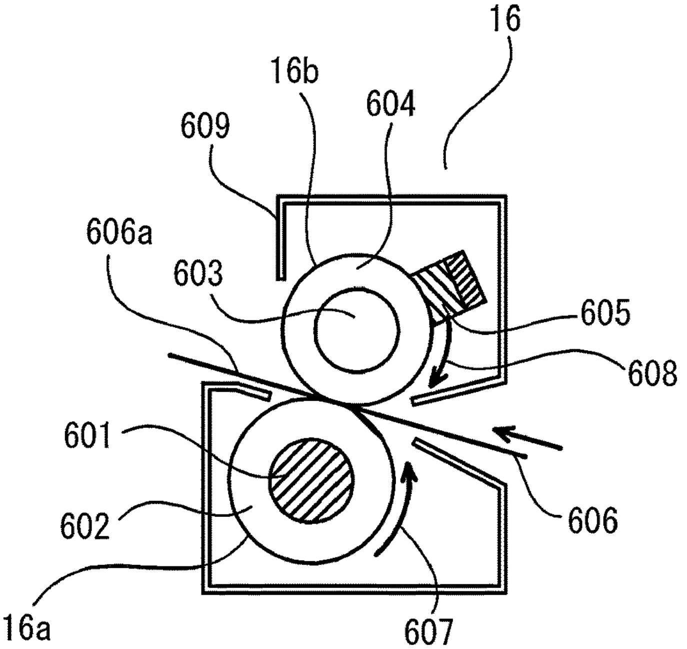
Figure 6:
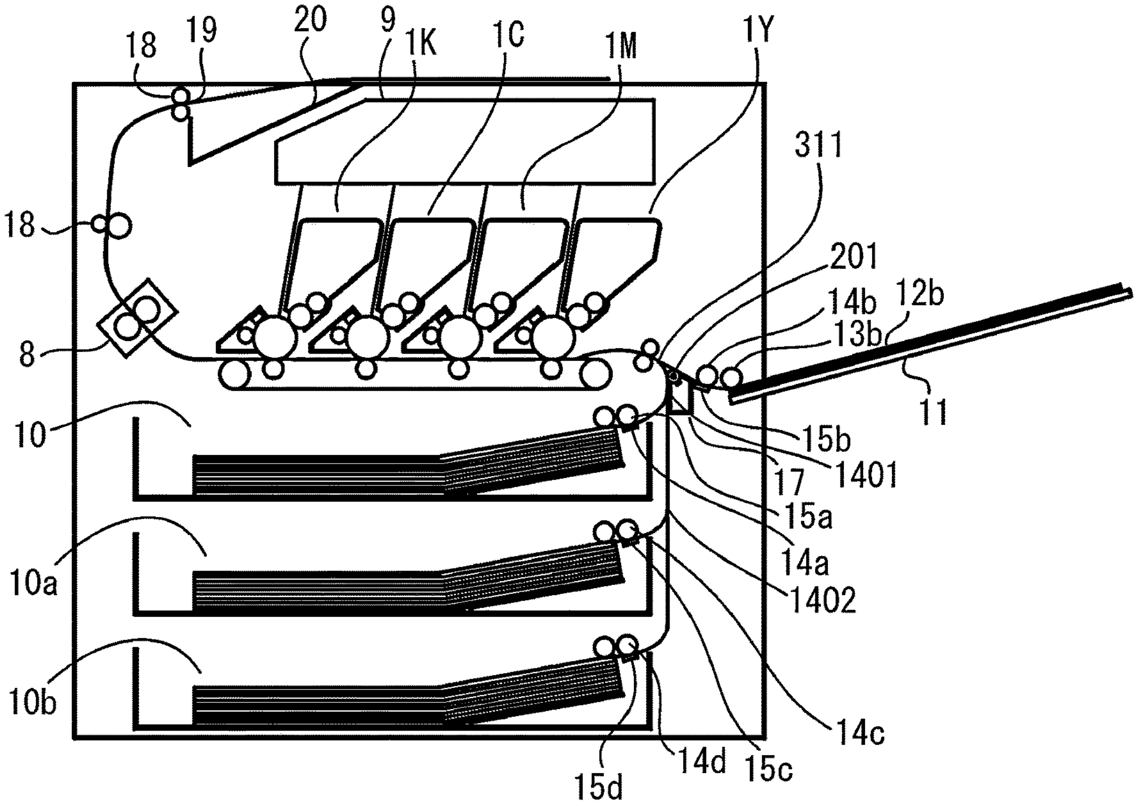

Parts (a) and (b) of FIG. 6 are schematic views showing a modified embodiment of the embodiment 1, in which part (a) illustrates a second paper dust collecting mechanism provided in a registration unit, and part (b) illustrates a state in which a sheet feeding portion is additionally provided.

Figure 7:
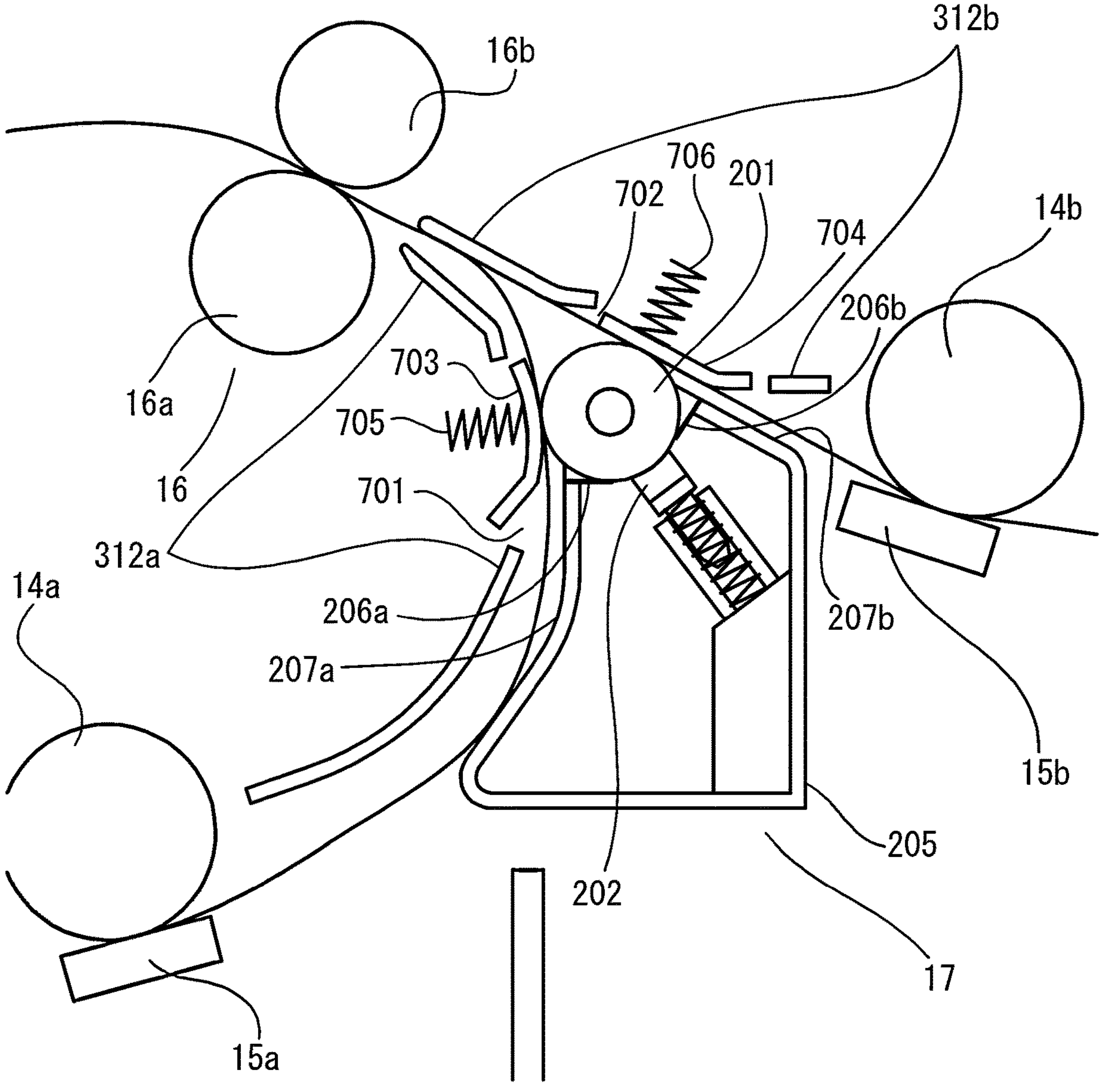

FIG. 7 is a schematic view for illustrating a periphery of a paper dust collecting unit in an embodiment 2.

Figure 8:
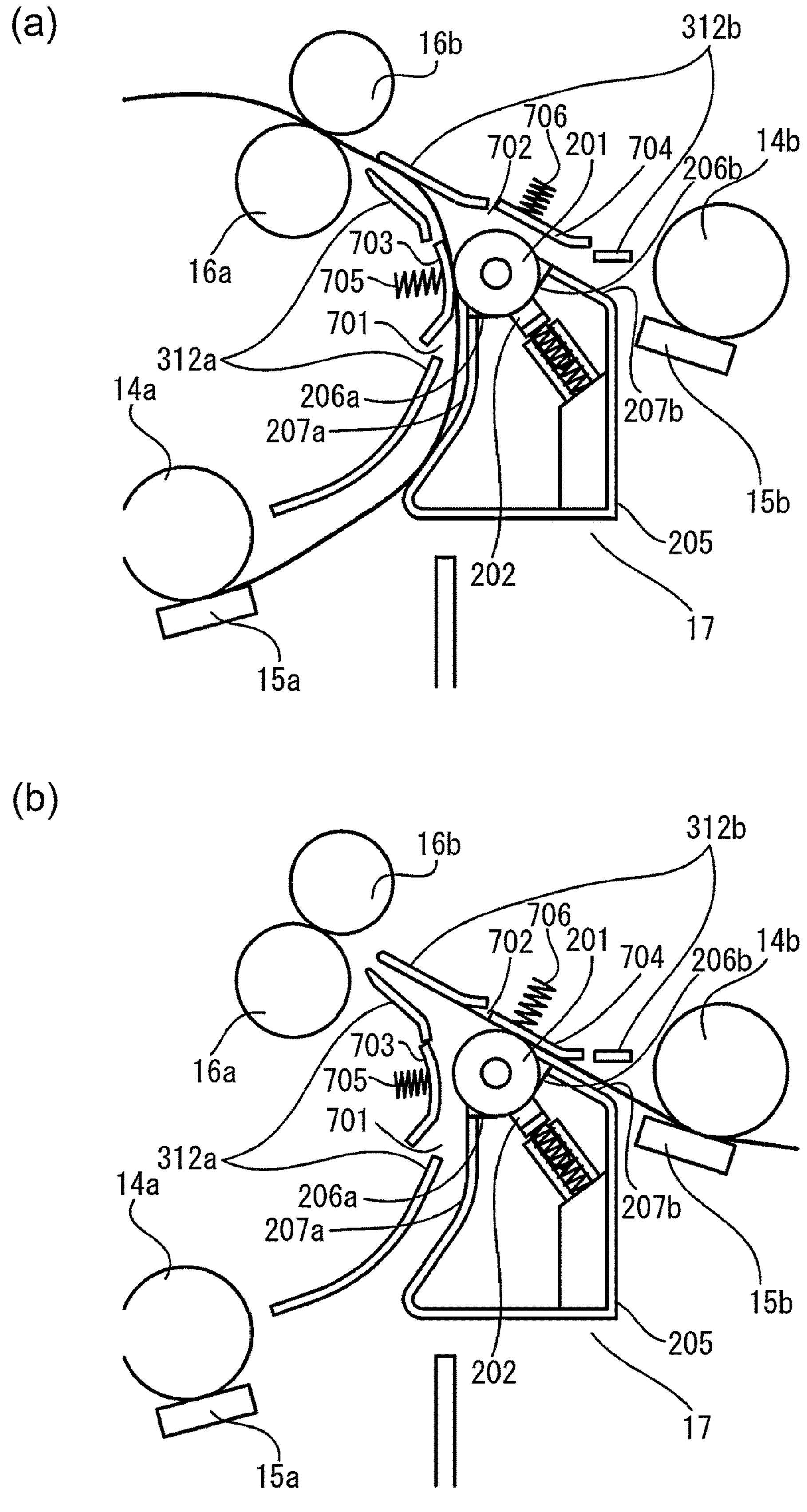

Parts (a) and (b) of FIG. 8 are schematic views each for illustrating a separation operation of a guiding member in the embodiment 2.

Figure 9:
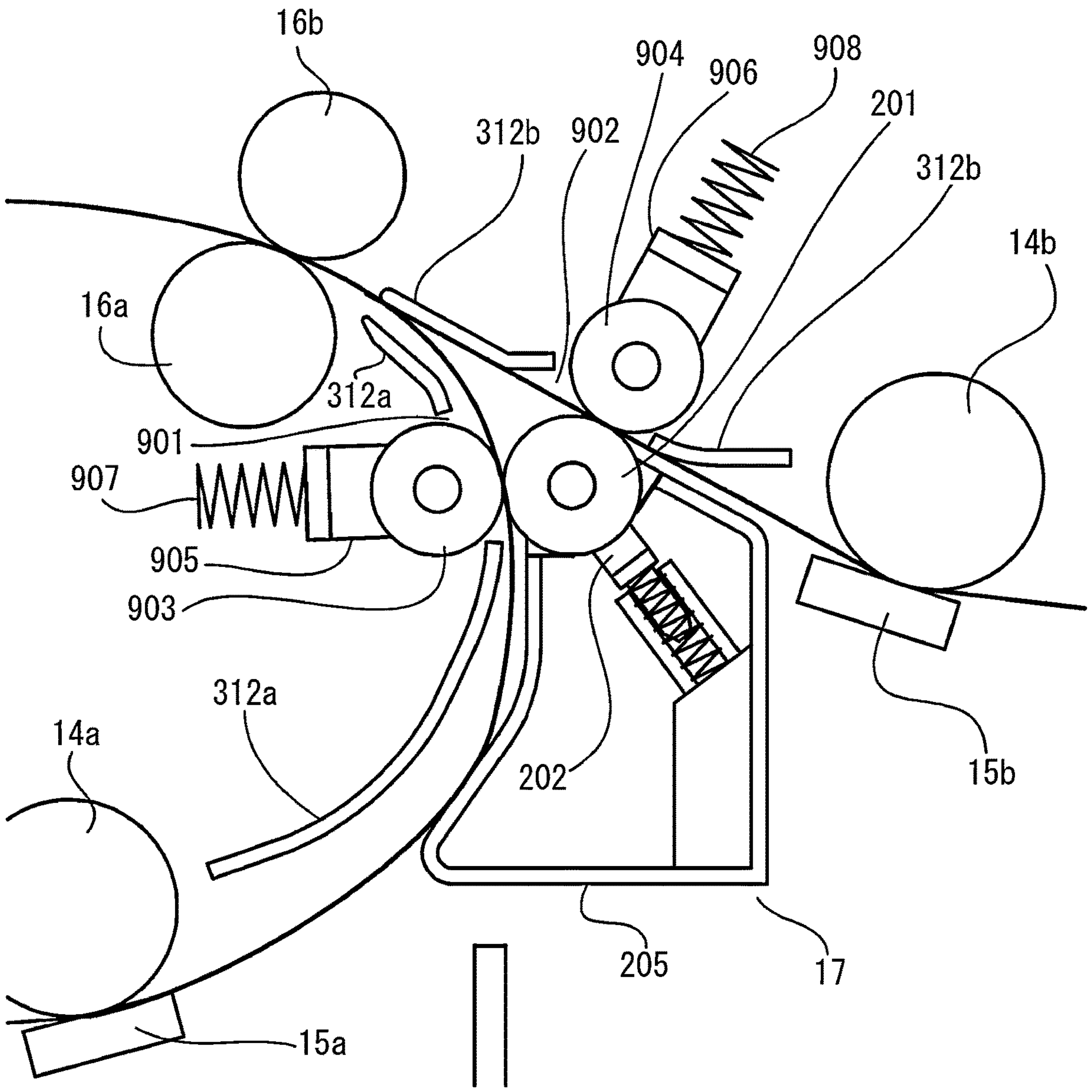

FIG. 9 is a schematic view for illustrating a periphery of a paper dust collecting unit in an embodiment 3.

Figure 10:
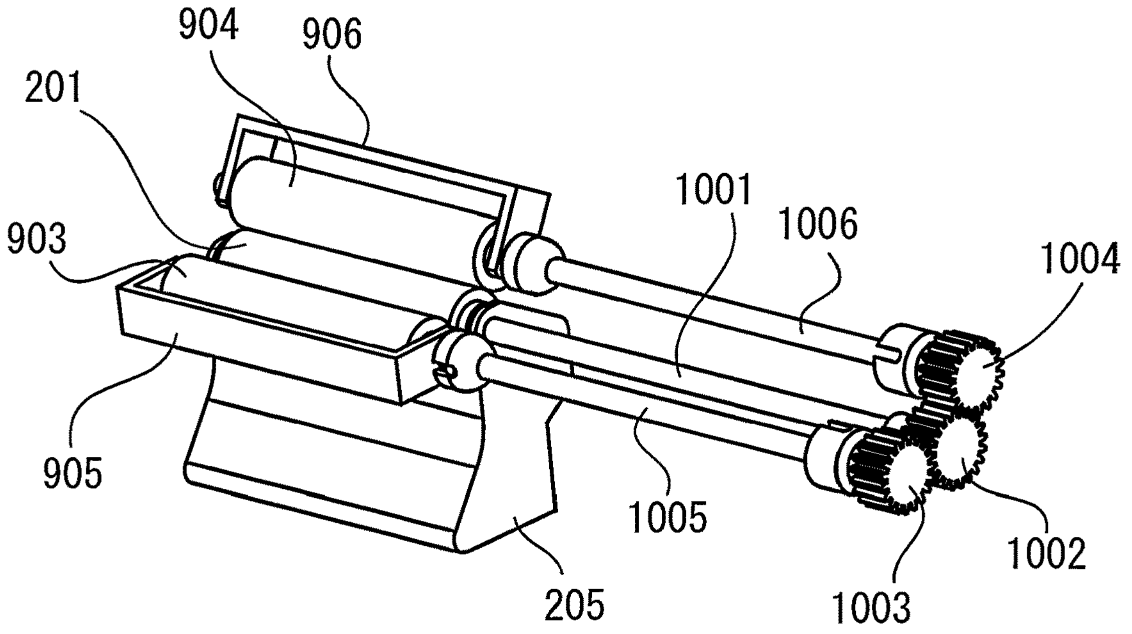
Figure 10:
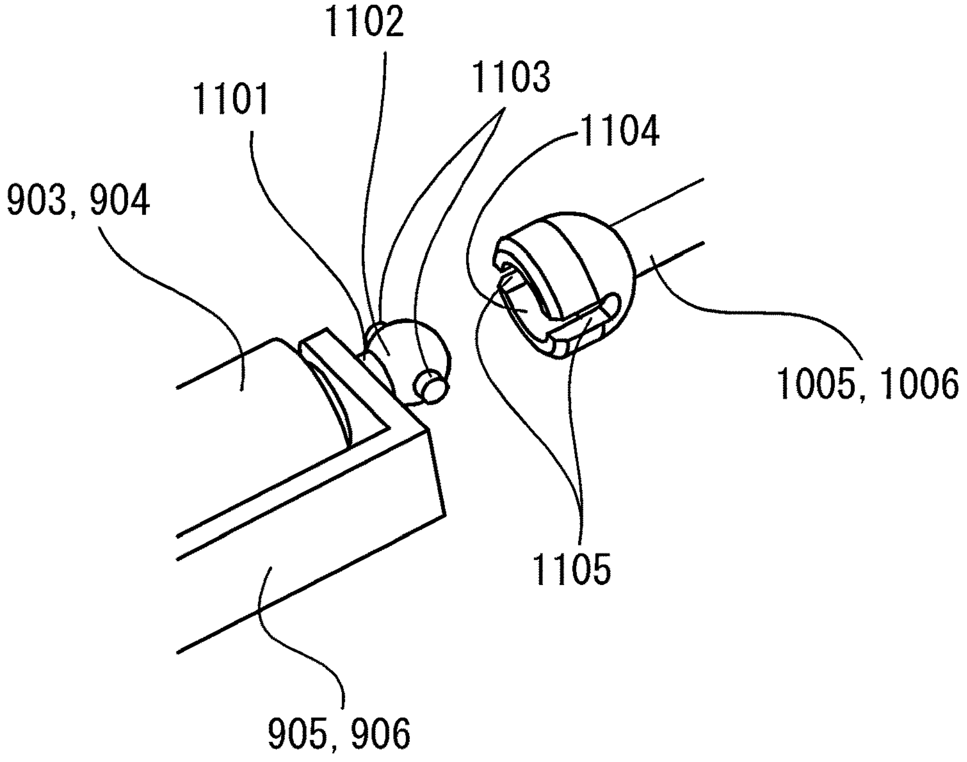

Part (a) of FIG. 10 is a schematic view for illustrating the paper dust collecting unit in the embodiment 3, and part (b) of FIG. 10 is a schematic view for illustrating a drive-transmitting portion of an opposite roller in the embodiment 3.

Figure 11:
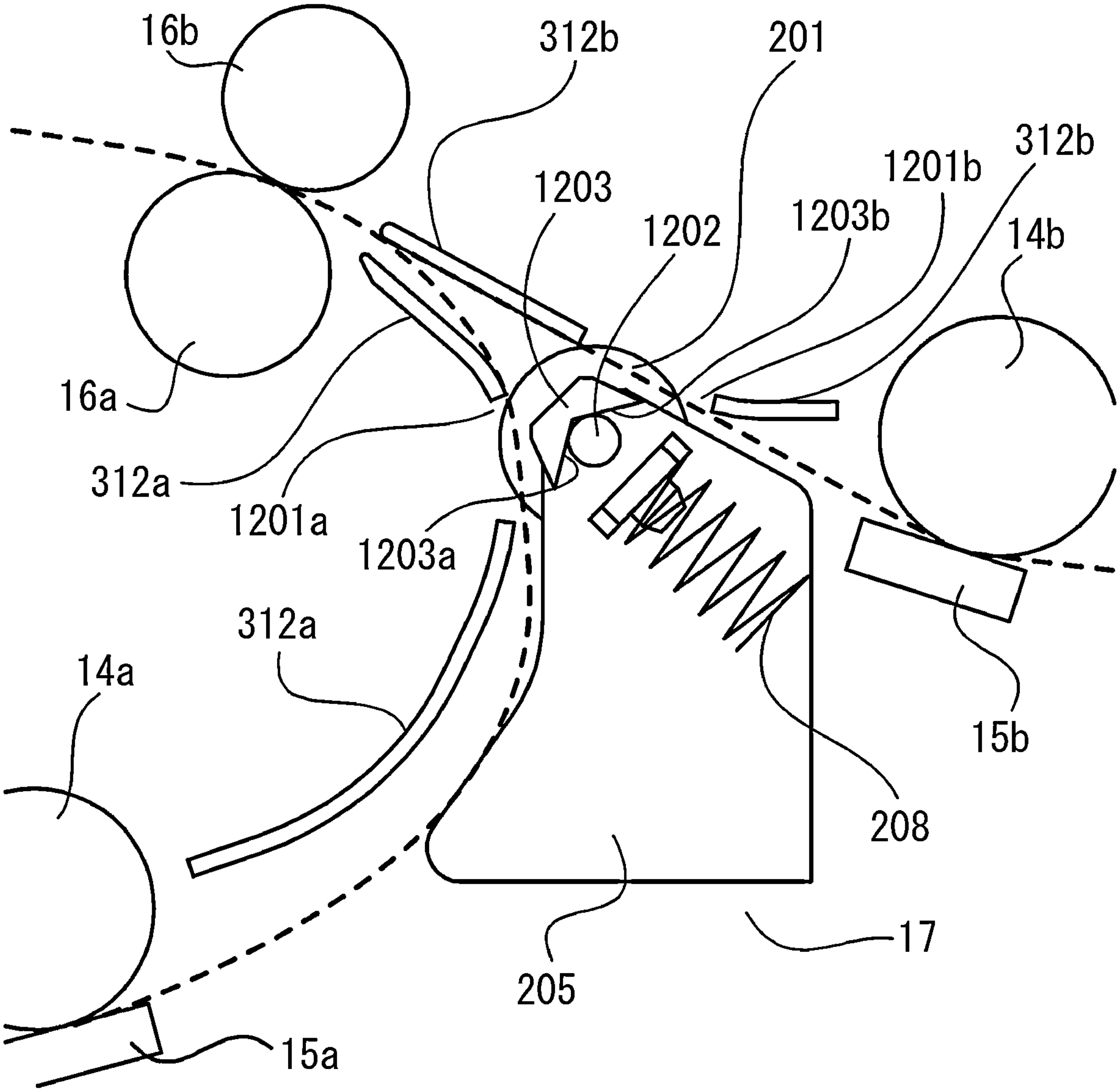

FIG. 11 is a schematic view for illustrating a paper dust collecting unit in an embodiment 4.

Figure 12:
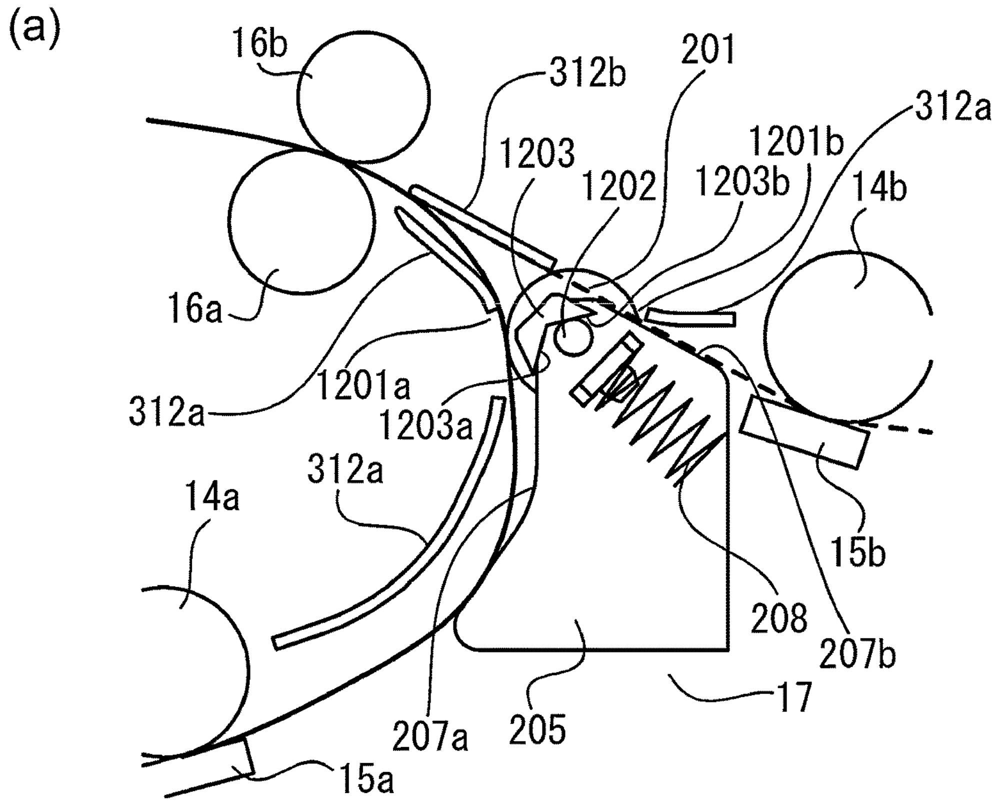
Figure 12:
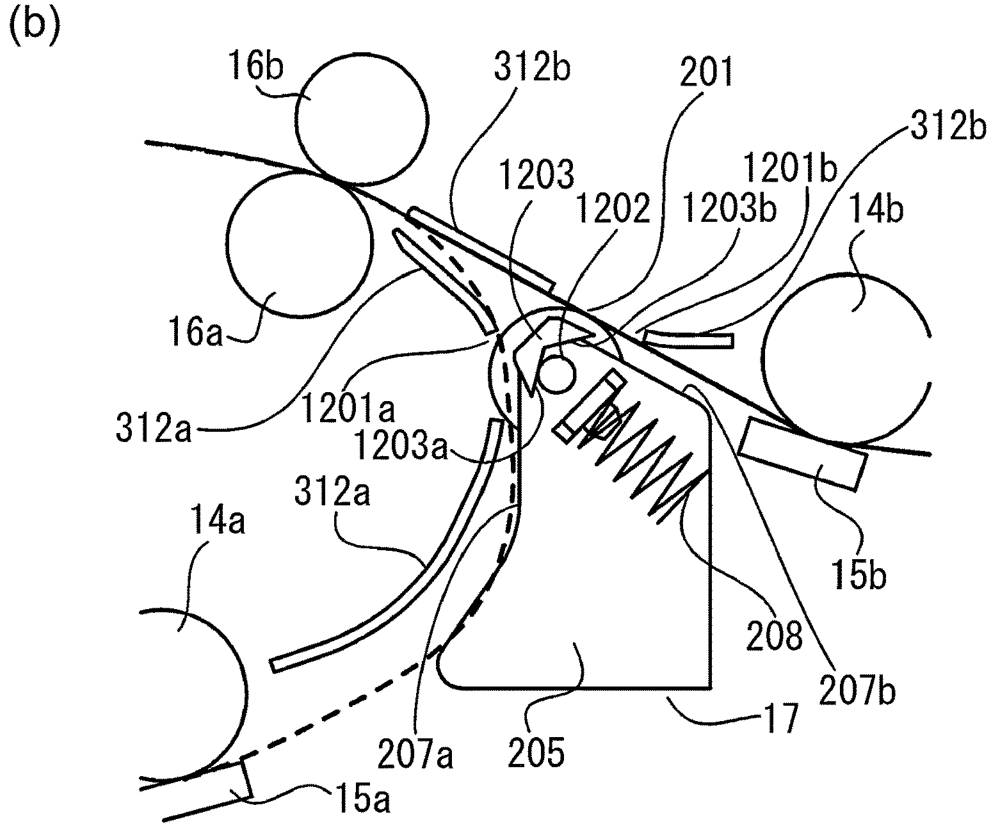

Parts (a) and (b) of FIG. 12 are sectional views each for illustrating a state of the paper dust collecting unit during sheet conveyance in the embodiment 4.

DESCRIPTION OF THE EMBODIMENTS

Embodiment 1

[Image Forming Apparatus]

Figure 1:
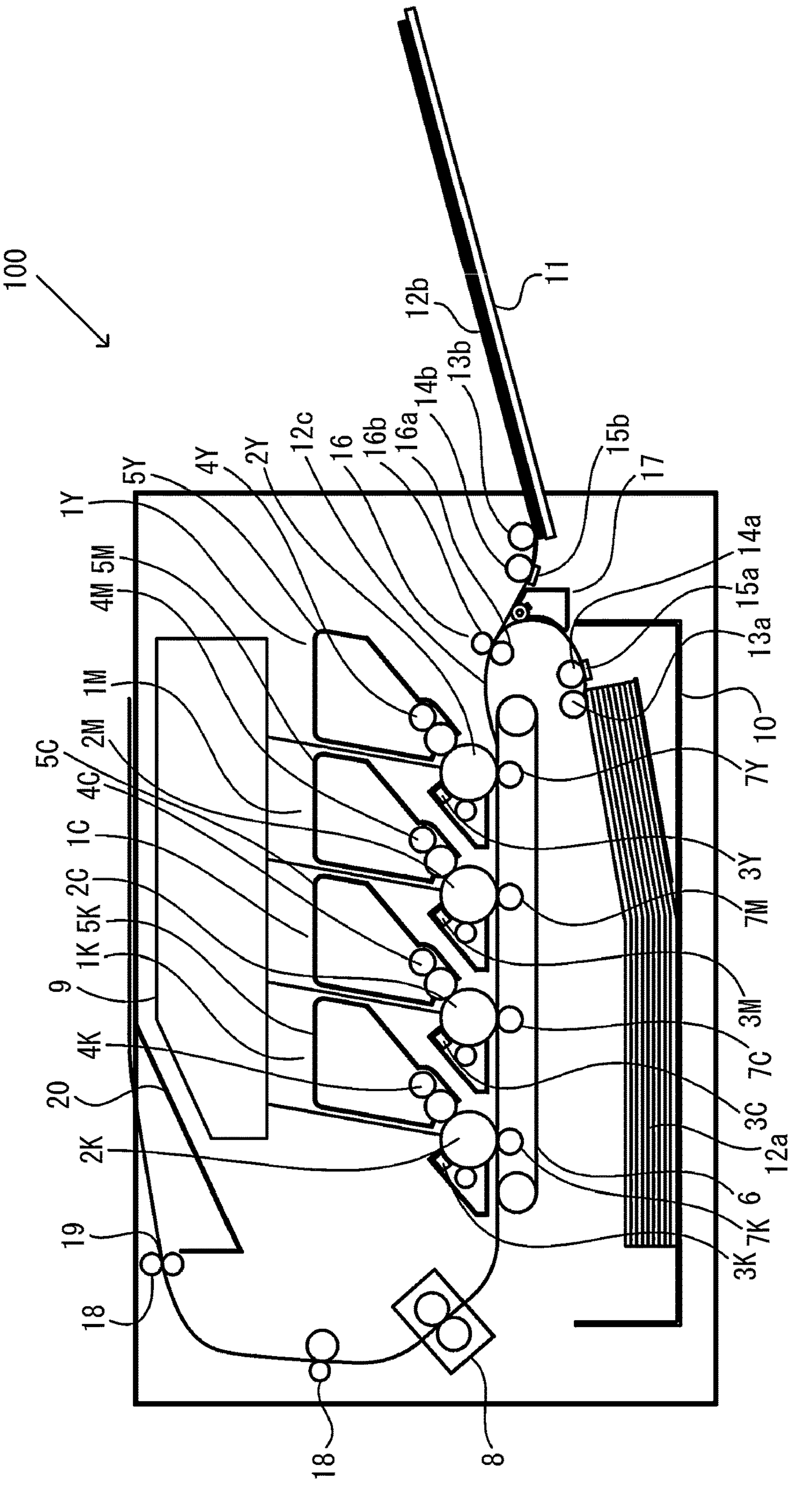
FIG. 1 is a sectional view showing an image forming apparatus according to an embodiment 1.

FIG. 1 is a sectional view for illustrating an image forming apparatus according to an embodiment 1. Here, an image forming apparatus 100 is a color image forming apparatus for forming a full-color image with toner of four colors of yellow, magenta, cyan, and black. The image forming apparatus 100 includes process cartridge 1Y, 1M, 1C, and 1K. The process cartridges 1Y, 1M, 1C, and 1K correspond to the colors of yellow, magenta, cyan, and black, respectively. In the following, as regards Y, M, C, and K representing the colors are omitted in some instances except for the case where description is made particularly for an associated color. The process cartridges 1Y, 1M, 1C, and 1K include photosensitive drums 2Y, 2M, 2C, and 2K, charging devices 3Y, 3M, 3C, and 3K, developing devices 4Y, 4M, 4C, and 4K, toner containers 5Y, 5M, 5C, and 5K, and the like, respectively. The image forming apparatus 100 includes a conveyance belt 6, transfer rollers 7Y, 7M, 7C, and 7K, a fixing device 8, a laser scanner 9, a sheet feeding cassette 10 which is a first sheet feeding portion, and a multi-tray 11 which is a second sheet feeding portion. In the sheet feeding cassette 10, sheets 12*a* which are a first recording material are stacked, and on the multi-tray 11, sheets 12*b* which are a second recording material are stacked. The laser scanner 9, the process cartridges 1, and the transfer rollers 7 are included in image forming portions (image forming means).

Further, the sheet feeding cassette 10 is provided with a pick-up roller 13*a*, a separation roller 14*a*, and a separation pad 15*a*. The multi-tray 11 is provided with a pick-up roller 13*b*, a separation roller 14*b* and a separation pad 15*b*. The separation roller 14*a* and the separation pad 15*a*, which are a first separating member, separate only one sheet when a plurality of sheets 12*a* are fed from the sheet feeding cassette 10 in an overlapping state and then convey the separated sheet toward a downstream side in a conveying direction. The separation roller 14*b* and the separation pad 15*b*, which are a second separating member, separate only one sheet when a plurality of sheets 12*b* are fed from the multi-tray 11 in an overlapping state and then convey the separated sheet toward a downstream side in a conveying direction. The image forming apparatus 100 includes a registration unit 16, and the registration unit 16 includes a registration roller 16*a* and a registration opposite roller 16*b*. The image forming apparatus 100 also includes a paper dust collecting unit 17 which is a collecting means, and this will be described later. The image forming apparatus 100 is also provided with a plurality of a plurality of discharging roller pairs 18, a discharge opening 19, and a discharge stacking portion 20. Incidentally, a sheet 12*c* shows a sheet during sheet feeding.

[Operation of Image Forming Apparatus]

Next, an operation of the image forming apparatus 100 will be described. The laser scanner 9 emits a laser beam (flux) which blinks depending on an image signal generated by a controller (not shown), so that a surface of the photosensitive drum 2 is scanned with the laser beam. By this, an electrostatic latent image is formed on the photosensitive drum 2. Then, the electrostatic latent image is developed into toner image by the developing device 3 with toner accommodated in the toner container 5. On the other hand, the sheet 12*a* or the sheet 12*b* placed on the sheet feeding cassette 10 or the multi-tray 11, respectively, is fed by the pick-up roller 13*a* or the pick-up roller 13*b*, respectively. The fed sheets are separated into a single sheet by the separation roller 14*a* or the separation roller 14*b*, and the separated sheet is conveyed toward the registration unit 16. Here, as a mechanism for separating the sheets 12*a* or the sheets 12*b* into a single sheet, the mechanism utilizes a difference in friction coefficient between the separation roller 14*a* and the separation pad 15*a* or between the separation roller 14*b* and the separation pad 15*b* with the sheet.

The sheet 12*c* which reached the registration unit 16 is subjected to alignment of a leading end position thereof by the registration unit 16, and thereafter, the sheet 12*c* is conveyed onto the conveyance belt 6 by being timed to the above-described toner image formation. Onto the sheet placed on the conveyance belt 6, the respective color toner images are successively transferred superposedly in nips between the photosensitive drums 2Y, 2M, 2C, and 2K and the transfer rollers 7Y, 7M, 7C, and 7K, respectively. Thereafter, the sheet on which the toner images are transferred passes through the fixing device 8, so that unfixed toner is fixed on the sheet. The sheet subjecting to fixing is conveyed to the discharge opening 19 by the plurality of the discharging roller pairs 18, and thereafter is discharged to an outside of the image forming apparatus 100 and is stacked on the discharge stacking portion 20.

[Paper Dust Collecting Unit]

Parts (a) and (b) of FIG. 2 shows the paper dust collecting unit 17, in which part (a) is a perspective view and part (b) is a sectional view. The paper dust collecting unit 17 includes a paper dust collecting roller 201, a sponge member 202, a sponge holding member 203, a first spring member 204, a paper dust collecting case 205, and a pair of back flow preventing sheets 206*a* and 206*b*. The paper dust collecting roller 201 includes a surface 201*a* and a rotation shaft 201*b*. The paper dust collecting roller 201 is capable of being rotated about the rotation shaft 201*b* not only in the clockwise direction but also in the counterclockwise direction in FIG. 2. Incidentally, in the following, description will be made on the assumption that the paper dust collecting roller 201 is rotated by conveyance of the sheet, but may also be driven and rotated by a driving source such as a motor capable of being normally rotated reversely rotated.

The sponge holding member 203 fixes the sponge member 202. The first spring member 204 urges the sponge member 202 fixed by the sponge holding member 203, toward the paper dust collecting roller 201. The paper dust collecting case 205 rotatably supports the paper dust collecting roller 201. The paper dust collecting case 205 has a hollow shape and is capable of storing paper dust (paper powder) collected in an inside space 205*a* by the paper dust collecting roller 201. Incidentally, collection of the paper dust stored in the inside space 205*a* may be performed manually or automatically.

Further, on an inner wall 205*b* of the inside space 205*a*, guiding portions 205*c* when the sponge holding member 203 is urged by the paper dust collecting roller 201 are provided. The pair of back flow preventing sheets 206*a* and 206*b* is fixed to the paper dust collecting case 205 so as to be disposed on both sides of the paper dust collecting roller 201.

Further, an outer wall of the paper dust collecting case 205 is provided with a first guiding surface 207*a* and a second guiding surface 207*b*, and in addition, is provided with a second urging spring member 208 which is an urging means.

In the following, the first and second guiding surfaces 207*a* and 207*b* are referred to simply as guiding surfaces 207*a* and 207*b*, respectively. The guiding surface 207*a* is provided upstream of the paper dust collecting roller 201 with respect to the conveying direction and opposes a guiding member 312*a* described later. The guiding surface 207*b* is provided upstream of the paper dust collecting roller 201 with respect to the conveying direction and opposes a guiding member 312*b* described later. The guiding surface 207*a* is provided for guiding the sheet 12*a* fed by the sheet feeding cassette 10. That is, the sheet 12*a* fed from the sheet feeding cassette 10 is first contacted to the guiding surface 207*a* at a leading end thereof and then is guided to the paper dust collecting roller 201 positioned downstream with respect to the conveying direction along the guiding surface 207*a*. The guiding surface 207*b* is provided for guiding the sheet 12*b* fed by the multi-tray 11. That is, the sheet 12*b* fed from the multi-tray 11 is first contacted to the guiding surface 207*b* at a leading end thereof and then is guided to the paper dust collecting roller 201 positioned downstream with respect to the conveying direction along the guiding surface 207*b*.

Thus, the paper dust collecting unit 17 is commonly used to the sheet 12*a* fed from the sheet feeding cassette 10 and the sheet 12*b* fed from the multi-tray 11. The second urging spring member 208 urges the paper dust collecting unit 17 in a merging portion direction described later with reference to FIG. 3. The second urging spring member 208 is provided on both sides of the paper dust collecting roller 201 with respect to a rotation shape 201*b* direction.

Incidentally, in part (a) of FIG. 2, of the two second urging spring members 208, the other (rear-side) urging spring member is not shown.

[Sheet Feeding Operation]

FIG. 3 is an enlarged view showing a neighborhood of the paper dust collecting unit 17 of FIG. 1, and a sheet feeding operation will be specifically described using FIG. 3. When the sheet is fed from the sheet feeding cassette 10, first, an uppermost sheet of the sheets 12*a* placed on the sheet feeding cassette 10 is fed by rotation of the pick-up roller 13*a* disposed in the neighborhood of one end of the sheet feeding cassette 10 with respect to a sheet feeding direction. At this time, in the case where a plurality of sheets are fed in an overlapping state, only the uppermost sheet is separated in a separation nip 310*a* formed by the separation roller 14*a* and the separation pad 15*a* and then is conveyed toward a subsequent member. Specifically, each of the separation roller 14*a* and the separation pad 15*a* are formed of a member, such as a rubber, of which surface has high friction coefficient and low hardness, so that a high frictional force is generated between these separation roller 14*a* and separation pad 15*a*, and the fed sheet 12*a*. This frictional force is higher than a frictional force between the sheets fed in the overlapping state. For this reason, the sheets fed in the overlapping state slip the between, so that only the uppermost sheet is conveyed toward a downstream side in the conveying direction. Incidentally, in FIG. 3, a path along which each of the sheet fed from the sheet feeding cassette 10 and the sheet fed from the multi-tray 11 is conveyed is indicated by a broken line.

On the sides of the paper dust collecting roller 201, the first guiding member 312*a* and the second guiding member 312*b* for guiding the sheet fed from the sheet feeding cassette 10 and the sheet fed from the multi-tray 11, respectively, toward a merging portion 311 are provided. In the following, the first guiding member 312*a* and the second guiding member 312*b* are referred to simply as guiding members 312*a* and 312*b*. Here, on a side upstream of the merging portion 311 with respect to the conveying direction, the sheet fed from the sheet feeding cassette 10 and the sheet fed from the multi-tray 11 are conveyed along different paths. On the other hand, on a side downstream of the merging portion 311 with respect to the conveying direction, the sheet fed from the sheet feeding cassette 10 and the sheet fed from the multi-tray 11 are conveyed along the same path. For this reason, a boundary between a portion where the sheet fed from the sheet feeding cassette 10 and the sheet fed from the multi-tray 11 are conveyed along the different paths and a portion where these sheets are conveyed along the same path is referred to as the merging portion 311. The merging portion 311 can be said to be a portion where a first path along which the sheet 12*a* is conveyed until the sheet 12*a* reaches the image forming portion and a second path along which the sheet 12*b* is conveyed until the sheet 12*b* reaches the image forming portion cross each other.

Further, as regards the sheet fed from the sheet feeding cassette 10, the side of the paper dust collecting roller 201 is included in a portion along the path for guiding the sheet from the separation roller 14*a* to the registration unit 16 through the paper dust collecting roller 201. Further, as regards the sheet fed from the multi-tray 11, the side of the paper dust collecting roller 201 is included in a portion along the path for guiding the sheet from the separation roller 14*b* to the registration unit 16 through the paper dust collecting roller 201.

The sheet passed through the separation nip 310*a* reaches a nip 315*a* between the paper dust collecting roller 201 and the guiding member 312*a* while being guided by the guiding member 312*a* and the guiding surface 207*a* provided on the paper dust collecting case 205. In other words, a conveying path of the sheet fed from the sheet feeding cassette 10 is formed by the guiding surface 207*a* of the paper dust collecting unit 17 and the guiding member 312*a*.

On the other hand, in the case of the sheet feeding operation from the multi-tray 11, similarly as in the case of the sheet feeding operation from the sheet feeding cassette 10, only one uppermost sheet is fed by the pick-up roller 13*b*, the separation roller 14*b*, and the separation pad 15*b*. The fed sheet reaches a nip 315*b* between the paper dust collecting roller 201 and the guiding member 312*b* while being guided by the guiding member 312*b* and the guiding surface 207*b* provided on the paper dust collecting case 205. In other words, a conveying path of the sheet fed from the multi-tray 11 is formed by the guiding surface 207*b* of the paper dust collecting unit 17 and the guiding member 312*b*.

As described above, the conveying paths of the sheet fed from the sheet feeding cassette 10 and the multi-tray 11 pass through the nip 315*a* or the nip 315*b* and then merge at the merging portion 311 in front of the registration unit 16, and reach the registration unit 16. Here, the guiding members 312*a* and 312*b* are disposed so that an interval these between becomes narrow toward the merging portion 311, and the paper dust collecting roller 201 is disposed between these guiding members 312*a* and 312*b*. Further, the second urging spring member 208 (not shown in FIG. 3) urges the paper dust collecting unit 17 toward the merging portion 311 in an arrow 313 direction as described above. In FIG. 3, an urging force in the arrow 313 direction is divided into components of force in a direction perpendicular to a virtual tangential line in the nip 315*a* and in a direction perpendicular to a virtual tangential line in the nip 315*b*, and these components of force are referred to as component forces 314*a* and 314*b*, respectively. The component forces 314*a* and 314*b* of the urging force of the second urging spring member 208 presses the paper dust collecting roller 201 toward both the guiding members 312*a* and 312*b*, respectively. The component force 314*a* passes the paper dust collecting roller 201 against the guiding member 312*a* in the nip 315*a*, so that the paper dust deposited on the sheet passing through the nip 315*a* can be efficiently collected by the paper dust collecting roller 201. Further, the component force 314*b* presses the paper dust collecting roller 201 against the guiding member 312*a* in the nip 315*b*, so that the paper dust deposited on the sheet passing the nip 315*b* can be efficiently collected by the paper dust collecting roller 201.

[Paper Dust Collecting Operation]

Next, a paper dust collecting operation of the paper dust collecting unit 17 will be specifically described. Here, the paper dust is a powdery substance generated from the sheet which is fed or conveyed, and contains fibrous pieces constituting the sheet and a filler such as calcium carbonate or talc. When this paper dust is mixed with the toner and then is subjected to development, the paper dust causes an image defect due to appearance in a black spot shape on an image, and when the paper dust is deposited and stagnated in an unshown cleaner portion, the paper dust causes improper cleaning.

Further, there is a liability that the paper dust is generated in a process in which the sheet is conveyed in the image forming apparatus 100, but the paper dust is generated in a large amount from portions where the sheet contacts the separation pads 15*a* and 15*b* during the sheet feeding.

This is because the surfaces of the separation pads 15*a* and 15*b* are high in friction coefficient, and the sheets are pressed against the separation pads 15*a* and 15*b*, respectively, which are in a stationary state, and therefore, the surfaces of the sheets are rubbed and passed while being abraded. For these reasons, the paper dust collecting unit 17 is required to employ a constitution in which the paper dust from the portions where the sheets contact the separation pads 15*a* and 15*b* can be collected.

Here, as regards the sheets fed from both of the sheet feeding cassette 10 and the multi-tray 11, a surface of the sheet on a side contacting the separation pad 15*a* or 15*b* is referred in the following as a separation surface side. In order to collect the paper dust deposited on the separation surface side of the sheet, the paper dust collecting unit 17 in the embodiment 1 employs a constitution in which the paper dust is collected by bringing the paper dust collecting roller 201 into contact with the separation surface side of the sheet fed from each of both the sheet feeding cassette 10 and the multi-tray 11.

Further, the paper dust collecting unit 17 employs a type in which the surface 201*a* of the paper dust collecting roller 201 is charged and the paper dust is adsorbed by an electrostatic force. Specifically, the paper dust collecting roller 201 is formed of a fluorine-containing resin material such as PFA (perfluoroalkoxyalkane) liable to charge at least the surface 201*a* contacting the sheet. The paper dust collecting unit 17 includes the sponge member 202 which contacts the paper dust collecting roller 201 and which is a charging member for charging the paper dust collecting roller 201 by friction when the paper dust collecting roller 201 rotates. The paper dust collecting roller 201 is charged by the sponge member 202, so that the paper dust is adsorbed by an electrostatic force. Thus, the paper dust collecting roller 201 is rotated while pressing the surface 201*a* thereof by the sponge member 202 formed of urethane or nylon, so that the surface 201*a* is charged and caused to adsorb the paper dust.

Further, the sponge member 202 has also a function of scraping off the paper dust adsorbed on the surface 201*a* of the paper dust collecting roller 201. Details thereof will be described using FIGS. 4 and 5.

[Collection of Paper Dust]

(Case That Sheet is Fed from Sheet Feeding Cassette)

In the case where the sheet is fed from the sheet feeding cassette 10, as shown in FIG. 4, an uppermost sheet 401 of the sheets 12*a* stacked on the sheet feeding cassette 10 passes through the separation nip 310*a* between the separation roller 14*a* and the separation pad 15*a*. By this, the paper dust is generated, and the sheet 401 is conveyed in a state in which the paper dust is deposited on the surface thereof on a separation surface side 401*a*. In the following, the paper dust deposited on the separation surface side 401*a* of the sheet 401 is referred to as paper dust 402 (first paper dust). In this state, when the sheet 401 reaches the nip 315*a* between the paper dust collecting roller 201 and the guiding member 312*a*, the paper dust 402 is electrostatically adsorbed on the charged surface 201*a* of the paper dust collecting roller 201 and is separated (removed) from the separation surface side 401*a* of the sheet 401. In the following, the paper dust adsorbed by the paper dust collecting roller 201 is referred to as adsorbed paper dust 405.

The paper dust collecting roller 201 is rotated in an arrow 404 direction which is a first direction by being timed to passing of the sheet 401, so that the adsorbed paper dust 405 adsorbed on the surface 201*a* of the paper dust collecting roller 201 and is conveyed with rotation of the paper dust collecting roller 201. The adsorbed paper dust 405 passes through the back flow preventing sheet 206*b* and reaches the sponge member 202. Incidentally, the back flow preventing sheet 206*b* will be described later. Then, the sponge member 202 scrapes off the conveyed adsorbed paper dust 405 from the surface 201*a* of the paper dust collecting roller 201 and is stagnated on a side of the sponge member 202 as indicated by 406 (hereinafter, this paper dust is referred to as collected paper dust 406).

(Case That Sheet is Fed from Sheet Feeding Cassette)

Next, in the case where the sheet is fed from the multi-tray 11, as shown in FIG. 5, an uppermost sheet 501 of the sheets 12*b* stacked on the multi-tray 11 passes through the separation nip 310*b* between the separation roller 14*b* and the separation pad 15*b*. By this, the paper dust is generated, and the sheet 501 is conveyed in a state in which the paper dust is deposited on the surface thereof on a separation surface side 501*a*. In the following, the paper dust deposited on the separation surface side 501*a* of the sheet 501 is referred to as paper dust 502 (second paper dust). In this state, when the sheet 501 reaches the nip 315*b* between the paper dust collecting roller 201 and the guiding member 312*b*, the paper dust 502 is electrostatically adsorbed on the charged surface 201*a* of the paper dust collecting roller 201 and is separated (removed) from the separation surface side 501*a* of the sheet 501. In the following, the paper dust adsorbed by the paper dust collecting roller 201 is referred to as adsorbed paper dust 505.

The paper dust collecting roller 201 is rotated in an arrow 504 direction which is a second direction, opposite to the direction when the sheet 401 is fed from the sheet feeding cassette 10, by being timed to passing of the sheet 401. The adsorbed paper dust 505 adsorbed on the surface 201*a* of the paper dust collecting roller 201 and is conveyed with rotation of the paper dust collecting roller 201. The adsorbed paper dust 505 passes through the back flow preventing sheet 206*a* and reaches the sponge member 202. Incidentally, the back flow preventing sheet 206*a* will be described later. Then, the sponge member 202 scrapes off the conveyed adsorbed paper dust 505 from the surface 201*a* of the paper dust collecting roller 201 and is stagnated on a side of the sponge member 202 as indicated by 506 (hereinafter, this paper dust is referred to as collected paper dust 506).

On the other hand, the collected paper dust 406 which is collected from the sheet 401 fed from the sheet feeding cassette 10 and which is stagnated on the side of the sponge member 202 is separated from the sponge member by reversely rotating the paper dust collecting roller 201. The paper dust separated from the sponge member 202 is scraped off as collected paper dust 507 from the paper dust collecting roller 201 by the back flow preventing sheet 206*b*. Incidentally, when the paper dust collecting roller 201 is rotated again in the arrow 404 direction of FIG. 4, similarly, the collected paper dust 506 stagnated on the side of the sponge member 202 is separated from the sponge member 202 and is scraped off from the paper dust collecting roller 201 by the back flow preventing sheet 206*a*.

[Backflow Preventing Sheet]

Each of the back flow preventing sheet 206*a* which is a first sheet and the back flow preventing sheet 206*b* which is a second sheet is a sheet which is formed of PET (polyurethane terephthalate) or the like which is about 0.1 mm or less in thickness. Each of the back flow preventing sheets 206*a* and 206*b* is fixed to the paper dust collecting case 205 at one end thereof and is obliquely contacted to the surface 201*a* of the paper dust collecting roller 201 at the other end thereof. The back flow preventing sheets 206*a* and 206*b* have flexibility.

The back flow preventing sheet 206*a* causes the paper dust adsorbed on the surface 201*a* of the paper dust collecting roller 201 to pass therethrough during the rotation of the paper dust collecting roller 201 in the arrow 504 direction (one direction) of FIG. 5. The back flow preventing sheet 206*a* scrapes off the paper dust on the surface 201*a* of the paper dust collecting roller 201 during the rotation of the paper dust collecting roller 201 in the arrow 404 direction (opposite direction) of FIG. 4. Thus, for the back flow preventing sheet 206*a*, an elastic property and a contact angle to the paper dust collecting roller 201 are set. That is, the back flow preventing sheet 206*a* is contacted to the paper dust collecting roller 201 so as to extend in a counter direction to the arrow 404 direction when the paper dust collecting roller 201 is rotated in the arrow 404 direction of FIG. 4.

The back flow preventing sheet 206*b* causes the paper dust adsorbed on the surface 201*a* of the paper dust collecting roller 201 to pass therethrough during the rotation of the paper dust collecting roller 201 in the arrow 404 direction (one direction) of FIG. 4. The back flow preventing sheet 206*b* scrapes off the paper dust on the surface 201*a* of the paper dust collecting roller 201 during the rotation of the paper dust collecting roller 201 in the arrow 504 direction (opposite direction) of FIG. 5. Thus, for the back flow preventing sheet 206*b*, an elastic property and a contact angle to the paper dust collecting roller 201 are set. That is, the back flow preventing sheet 206*b* is contacted to the paper dust collecting roller 201 so as to extend in a counter direction to the arrow 504 direction when the paper dust collecting roller 201 is rotated in the arrow 504 direction of FIG. 5.

For this reason, in the case where the sheet is fed from the sheet feeding cassette 10, the back flow preventing sheet 206*b* causes the paper dust adsorbed on the paper dust collecting roller 201 to pass therethrough. Further, at this time, the collected paper dust 506 which is collected by the back flow preventing sheet 206*a* during the sheet feeding from the multi-tray 11 and which is moved from the side of the sponge member 202 by the reverse rotation of the paper dust collecting roller 201 is scraped off by the back flow preventing sheet 206*a*.

On the other hand, in the case where the sheet is fed from the multi-tray 11, the back flow preventing sheet 206*a* causes the paper dust adsorbed on the paper dust collecting roller 201 to pass therethrough. Further, at this time, the collected paper dust 406 which is collected by the back flow preventing sheet 206*b* during the sheet feeding from the sheet feeding cassette 10 and which is moved from the side of the sponge member 202 by the reverse rotation of the paper dust collecting roller 201 is scraped off by the back flow preventing sheet 206*b*. Thus, the back flow preventing sheets 206*a* and 206*b* prevent that the paper dust collected in the inside space 205*a* of the paper dust collecting case 205 flows back and leaks to an outside by reverse rotation of the paper dust collecting roller 201. Then, when many sheets are fed and conveyed and an amount of the paper dust 406, 506, and 507 is increased by repetition of the above-described collecting operation, the paper dust drops by its self-weight, so that the paper dust is stored in the bottom of the inside space 205*a* of the paper dust collecting case 205 as indicated by 407 in FIGS. 4 and 5.

As described above, the back flow preventing sheet 206*a* is contacted to the paper dust collecting roller 201 so that one end thereof is provided downstream of the guiding surface 207*a* with respect to the conveying direction and the other end thereof is directed in a counter direction to the arrow 404 direction. The back flow preventing sheet 206*b* is contacted to the paper dust collecting roller 201 so that one end thereof is provided downstream of the guiding surface 207*b* with respect to the conveying direction and the other end thereof is directed in a counter direction to the arrow 504 direction. When the paper dust collecting roller 201 is rotated in the arrow 404 direction, the back flow preventing sheet 206*a* causes the collected paper dust 506 collected by the paper dust collecting roller 201 not to pass through a side downstream of a contact portion with the paper dust collecting roller 201 with respect to the arrow 404 direction. When the paper dust collecting roller 201 is rotated in the arrow 504 direction, the back flow preventing sheet 206*a* causes the adsorbed paper dust 505 collected by the paper dust collecting roller 201 to pass through a side downstream of a contact portion with the paper dust collecting roller 201 with respect to the arrow 504 direction. When the paper dust collecting roller 201 is rotated in the arrow 504 direction, the back flow preventing sheet 206*b* causes the collected paper dust 507 collected by the paper dust collecting roller 201 not to pass through a side downstream of a contact portion with the paper dust collecting roller 201 with respect to the arrow 504 direction. When the paper dust collecting roller 201 is rotated in the arrow 404 direction, the back flow preventing sheet 206*b* causes the adsorbed paper dust 405 collected by the paper dust collecting roller 201 to pass through a side downstream of a contact portion with the paper dust collecting roller 201 with respect to the arrow 404 direction.

As described above, according to the embodiment 1, by a single paper dust collecting roller 201, for sheets fed from both the sheet feeding cassette 10 and the multi-tray 11, the paper dust generated by friction (rubbing) with the separation pads 15*a* and 15*b* can be removed. By this, different from the conventional constitution, there is no need to individually provide the paper dust collecting mechanism corresponding to each of the plurality of sheet feeding portions, so that not only space saving can be realized, but also the number of the paper dust collecting rollers which are expensive and made of PFA can be reduced. For this reason, it is possible to realize the image forming apparatus reduced in size and cost.

Here, the separation pads 15*a* and 15*b* are not required to be provided over a whole area of a paper (sheet) width, and may be disposed only at a central portion with respect to a sheet width direction. Further, the paper dust collecting roller 201 is also not required to be provided over the whole area of the sheet width, and may only be required to have a width not less than a width of each of the separation pads 15*a* and 15*b*. That is, the paper dust generates due to friction with the separation pads 15*a* and 15*b*, and therefore, the width of the paper dust collecting roller 201 may only be required to set so as to include a paper dust generating region. This is similar for other embodiments described later. Incidentally, the width refers to a length in a direction perpendicular to the sheet conveying direction or a length in a rotation shaft 201*b* direction of the paper dust collecting roller 201.

As described above, the paper dust collecting unit 17 in the embodiment 1 is provided downstream of the sheet feeding cassette 10 and the multi-tray 11 and upstream of the merging portion 311 with respect to the sheet conveying direction. When the sheet 401 is fed, the paper dust collecting roller 201 collects the paper dust 402 while rotating in the arrow 404 direction in contact with the sheet 401. When the sheet 501 is fed, the paper dust collecting roller 201 collects the paper dust 502 while rotating in the arrow 504 direction in contact with the sheet 501. Further, the guiding member 312*a* opposes the paper dust collecting roller 201 and forms a part of the first path in cooperation with the paper dust collecting roller 201, and the guiding member 312*b* opposes the paper dust collecting roller 201 and forms a part of the second path in cooperation with the paper dust collecting roller 201. Further, the paper dust collecting roller 201 has a width, which is a length in a direction perpendicular to the conveying direction, not less than a width of each of the separation pads 15*a* and 15*b*.

Further, the paper dust collecting roller 201 may be of a following rotation type in which a driving source is not provided and the paper dust collecting roller 201 is rotated by following passing of the sheet, but may also have a form in which the paper dust collecting roller 201 is rotated by the driving source as described above. By rotationally driving the paper dust collecting roller 201 by the driving source, more efficient paper dust collecting can be performed.

Further, the paper dust collecting roller 201 has a so-called roller shape which is a cylindrical shape, but may have a rotatable brush form (brush shape) made of PFA or the like. As the rotatable brush form, for example, a constitution in which bristle bundles are planted in a surface of a cylindrical member and then the resultant member is made rotatable may be employed. This point is also similar for the other embodiments.

Further, in this embodiment, the example of the color image forming apparatus 100 was described, but the constitution of this embodiment may also be applied to a monochromatic image forming apparatus for printing an image of only a single (monochromatic) color on the sheet. This point is also similar for the other embodiments.

[Other Application Embodiments]

(Paper Dust Collection in Registration Unit)

In the case where a higher quality is needed, the paper dust collecting mechanism may also be provided for the registration unit 16. The registration unit 16 is provided downstream of the merging portion 311 and upstream of the image forming portion with respect to the sheet conveying direction. The registration unit 16 nips the sheet and conveys the sheet toward the image forming portion. An example of this is shown in part (a) of FIG. 6. In part (a) of FIG. 6, the registration roller 16*a* which is a second rotatable member is constituted by a metal shaft 601 and a rubber roller 602 which is fixed to an outer peripheral surface of the metal shaft 601 and which is rotated integrally with the metal shaft 601. On the other hand, the registration opposite roller 16*b* which is a first rotatable member is constituted by a metal shaft 603 and a paper dust collecting layer 604 which is fixed to an outer peripheral surface of the metal shaft 603 and which is rotated integrally with the metal shaft 603. Here, as the paper dust collecting layer 604 of the registration opposite roller 16*b*, similarly as the paper dust collecting roller 201, a tube formed of the fluorine-containing resin such as PFA liable to be charged may be used. The registration unit 16 includes a sponge member 605 which contacts the registration opposite roller 16*b* and which is a charging member for charging the paper dust collecting layer 604 by friction thereof when the registration opposite roller 16*b* rotates. Thus, to the registration opposite roller 16*b*, the sponge member 605 made of urethane or nylon is contacted. The registration opposite roller 16*b* is charged by the sponge member 605 adsorbs and collects the paper dust by an electrostatic force.

The registration roller 16*a* is rotationally driven in an arrow 607 direction in order to convey a sheet 606 passed through the merging portion 311. The registration opposite roller 16*b* is rotationally driven in an arrow 608 direction in order to convey the sheet 606 passed through the merging portion 311. The registration opposite roller 16*b* is rotated, whereby the paper dust collecting layer 604 is charged by friction with the sponge member 605, so that the paper dust is adsorbed and the paper dust adsorbed on the paper dust collecting layer 604 is scraped off. Further, the paper dust adsorbed on the paper dust collecting layer 604 is stored inside a second paper dust collecting case 609.

Here, the registration opposite roller 16*b* may be disposed on a side where the sheet 606 contacts the photosensitive drum 2, i.e., so as to contact a printing surface side 606*a*, and may have a width not less than a width wider than a maximum part (sheet) width (width of a largest recording material) among sheets capable of being conveyed by the image forming apparatus 100. By this, it is possible to collect the paper dust over a full width region of the printing surface side 606*a* of the sheet 606. By this, it is possible to prevent an occurrence of an image defect or the like due to deposition of paper dust, on the photosensitive drum 2, which generates during cutting or the like of the sheet and which is deposited on the sheet in advance. This point is also similar for the other embodiments described later. Incidentally, the registration opposite roller 16*b* rotates in the arrow 608 direction, but does not reversely rotate, and therefore, the back flow preventing sheets 206*a* and 206*b* used for the paper dust collecting unit 17 as described above are not provided. However, in order to assist or ensure scraping-off of the paper dust from the paper dust collecting layer 604, a sheet for scraping off the paper dust may be provided in contact with the paper dust collecting layer 604 so that a contact direction thereof is a counter direction to the arrow 608 direction of the paper dust collecting layer 604.

(Case That Three or More Sheet Feeding Portions are Provided)

Further, in the embodiment 1, the image forming apparatus 100 was provided with the two portions, as the sheet feeding portions, consisting of the sheet feeding cassette 10 and the multi-tray 11, but may also be provided with many (three or more) sheet feeding portions. For example, as shown in part (b) of FIG. 6, there is a case that an image forming apparatus 100 is provided with a sheet feeding cassette 10 which is a first sheet feeding cassette, and a second sheet feeding cassette 10*a* and a third sheet feeding cassette 10*b* which are disposed below the sheet feeding cassette 10. A sheet fed from the second sheet feeding cassette 10*a* is separated and fed as only one sheet by a separation roller 14*c* and a separation pad 15*c*. A sheet fed from the third sheet feeding cassette 10*b* is separated and fed as only one sheet by a separation roller 14*d* and a separation pad 15*d*.

The paper dust collecting unit 17 is also applicable to the case where at least one third sheet feeding portion on which a third recording material is placed and which is different from the sheet feeding cassette 10 and the multi-tray 11, such that the image forming apparatus 100 includes the second sheet feeding cassette 10*a* and the third sheet feeding cassette 10*c*. In this case, in contrast to the merging portion 311 which is the first merging portion, a portion (point in cross section) where the above-described first path and a third path along which the third recording material is conveyed until the third recording material reaches the image forming portion cross each other is referred to as merging portions 1401 and 1402 which are a second merging portion. In this case, a constitution in which in front of the paper dust collecting roller 201, i.e., in the merging portions 1401 and 1402 positioned upstream of the paper dust collecting roller 201 with respect to the sheet conveying direction, an associated conveying path merges with the conveying path from the sheet feeding cassette 10 may only be required to be employed. That is, the merging portions 1401 and 1402 may only be required to be positioned upstream of the paper dust collecting unit 17 with respect to the conveying direction.

By this, the sheet fed from the second sheet feeding cassette 10*a* and the sheet fed from the third sheet feeding cassette 10*b* are conveyed to between the guiding member 312*a* and the guiding surface 207*a* of the paper dust collecting unit 17. This point is also similar for the other embodiments described later.

As described above, according to the embodiment 1, the paper dust can be effectively removed for the plurality of sheet feeding portions without causing increases in size and cost of the image forming apparatus.

Embodiment 2

[Constitution of Guiding Member]

An embodiment 2 will be described using FIG. 7. In the embodiment 2, an opening 701 is formed in a position where the guiding member 312*a* opposes the paper dust collecting roller 201, and in the opening 701, a movable guide 703 which is a first portion is provided. Similarly, an opening 702 is formed in a position where the guiding member 312*b* opposes the paper dust collecting roller 201, and in the opening 702, a movable guide 704 which is a second portion is provided.

Further, the movable guide 703 is urged toward the paper dust collecting roller 201 by an urging spring 705 which is a first urging means. Similarly, the movable guide 704 is urged toward the paper dust collecting roller 201 by an urging spring 706 which is a second urging means. On the other hand, the two (a pair of) second urging spring members 208 used in the embodiment 1 are not used. Other constitutions are similar to those in the embodiment 1, and therefore, will be omitted from description.

[Guiding Urging Spring]

In the embodiment 1, the paper dust collecting roller 201 was urged against both the two guiding members 312*a* and 312*b* by using the second urging spring member 208, but in this embodiment, the movable guides 703 and 704 are urged against the paper dust collecting roller 201. In the embodiment 1, the guiding members 312*a* and 312*b* are pressed by the component forces 314*a* and 314*b*, respectively, of the second urging spring member 208, and therefore, the second urging spring member 208 required a large elastic force. On the other hand, in this embodiment, directions of urging forces of the urging springs 705 and 706 are the same as directions in which the movable guides 703 and 704 are pressed. By this, as forces for urging the movable guides 703 and 704 against the paper dust collecting roller 201, the elastic forces of the urging springs 705 and 706 can be efficiently used. For this reason, compared with the second urging spring member 208, in the urging springs 705 and 706, a spring with a small elastic force can be used, so that cost reduction and an improvement in assembling property can be realized.

Modified Embodiment (Contact and Separation of Movable Guide)

Further, a constitution in which the movable guides 703 and 704 can be separated from the paper dust collecting roller 201 may also be employed. Parts (a) and (b) of FIG. 8 are schematic views each showing a state in which the movable guides 703 and 704 are capable of being contacted to and separated from the paper dust collecting roller 201. When the sheet is fed from the sheet feeding cassette 10, the movable guide 704 may be separated as shown in part (a) of FIG. 8, and on the other hand, when the sheet is fed from the multi-tray 11, the movable guide 703 may be separated as shown in part (b) of FIG. 8. Thus, in a modified embodiment, when the sheet 12*a* is fed, the movable guide 703 is contacted to the paper dust collecting roller 201, and in addition, the movable guide 704 is separated from the paper dust collecting roller 201. Further, when the sheet 12*b* is fed, the movable guide 704 is contacted to the paper dust collecting roller 201, and in addition, the movable guide 703 is separated from the paper dust collecting roller 201.

A contact and separation mechanism (contact and separation means) for the movable guides 703 and 704 may have a constitution in which for example, a cam is provided and rotated in association with an operation for switching the sheet feeding portion between the sheet feeding cassette 10 and the multi-tray 11 and in which contact and separation of the movable guides 703 and 704 are switched. By this, only the movable guide on a side where the sheet is conveyed is always contacted to the paper dust collecting roller 201. Accordingly, compared with the case where the movable guides on both sides are contacted to the paper dust collecting roller 201, a resistance of the paper dust collecting roller 201 during the rotation when the movable guide on one side contacts the paper dust collecting roller 201 can be suppressed to low. By this, compared with the case where the two movable guides are contacted to the paper dust collecting roller 201, the paper dust collecting roller 201 can be smoothly rotated with a low torque.

As described above, according to the embodiment 2, the paper dust can be effectively removed for the plurality of sheet feeding portions without causing increases in size and cost of the image forming apparatus.

Embodiment 3

[Constitution of Opposite Roller]

An embodiment 3 will be described using FIG. 9. In the embodiment 3, an opening 901 is formed in a position where the guiding member 312*a* opposes the paper dust collecting roller 201, and in the opening 901, an opposite roller 903 which is a first roller is provided. Further, an opening 902 is formed in a position where the guiding member 312*b* opposes the paper dust collecting roller 201, and in the opening 902, an opposite roller 904 which is a second roller is provided. These opposite rollers 903 and 904 are each prepared by fixing a rubber roller to an outer peripheral portion of a shaft made of resin or metal, and are integrally rotated.

The opposite roller 903 is rotatably supported by a roller holding member 905, and the opposite roller 903 is urged (contacted) against the paper dust collecting roller 201 by pressing the roller holding member 905 with an urging spring 907 which is a first urging means. The opposite roller 904 is rotatably supported by a roller holding member 906, and the opposite roller 904 is urged (contacted) against the paper dust collecting roller 201 by pressing the roller holding member 906 with an urging spring 908 which is a second urging means.

Similarly as the urging springs 705 and 706 in the embodiment 2, directions of urging forces of the urging springs 907 and 908 are the same as directions in which the paper dust collecting roller 201 is pressed. For this reason, similarly as in the embodiment 2, compared with the second urging spring member 208, in the urging springs 907 and 908, a spring with a small elastic force can be used, so that cost reduction and an improvement in assembling property can be realized.

Further, the opposite rollers 903 and 904 have lengths substantially equal to those of the separation pads 15*a* and 15*b* similarly as the paper dust collecting roller 201. Other constitutions are similar to those in the embodiment 1, and therefore, description will be omitted.

Modified Embodiment: Contact and Separation of Opposite Roller

Further, similarly as in the embodiment 2, when the sheet fed from the sheet feeding cassette 10 is conveyed, the opposite roller 904 may be separated from the paper dust collecting roller 201. Further, when the sheet fed from the multi-tray 11 is conveyed, the opposite roller 903 may be separated from the paper dust collecting roller 201. That is, when the sheet 12*a* is fed, the opposite roller 903 is contacted to the paper dust collecting roller 201, and in addition, the opposite roller 904 is separated from the paper dust collecting roller 201. On the other hand, when the sheet 12*b* is fed, the opposite roller 904 is contacted to the paper dust collecting roller 201, and in addition, the opposite roller 903 is separated from the paper dust collecting roller 201.

A constitution and an effect of the contact and separation mechanism are similar to those in the embodiment 2, and therefore, description will be omitted.

[Constitution of Rollers When Driven by Driving Source]

In the embodiment 3, a constitution in which the paper dust collecting roller 201 and the opposite rollers 903 and 904 are rotated by receiving a driving force from a driving source such as a motor may be employed. An example thereof is shown in part (a) of FIG. 10. In part (a) of FIG. 10, from one end of the paper dust collecting roller 201, an extension shaft 1001 extends to an outside of a maximum width of the sheet conveyed. To the extension shaft 1001, a driving gear 1002 is fixed at an extended end thereof, and the paper dust collecting roller 201 and the driving gear 1002 are supported by unshown members so as to rotate integrally with each other. With the driving gear 1002, driving gears 1003 and 1004 for the opposite rollers 903 and 904, respectively, are engaged. The driving gears 1003 and 1004 for the opposite rollers 903 and 904 are connected to the opposite rollers 903 and 904 via driving shafts 1005 and 1006, respectively. Further, to the driving gear 1002, a driving source such as a motor capable of being normally rotated and reversely rotated is connected via unshown gears or the like. That is, the image forming apparatus 100 is provided with the driving source for rotating the paper dust collecting roller 201 in the arrow 404 direction and the arrow 504 direction. The driving gear 1002, the driving gear 1003, and the driving shaft 1005 are included in a first transmitting means for transmitting the driving force of the driving source to the opposite roller 903. The driving gear 1002, the driving gear 1004, and the driving shaft 1006 are included in a second transmitting means for transmitting the driving force of the driving source to the opposite roller 904.

Here, a connecting portion between the driving shaft 1005 (1006) and the opposite roller 903 (904) is shown in part (b) of FIG. 10. From one end of the opposite roller 903 (904), an opposite roller shaft 1101 is extended and is provided with a spherical body portion 1102 at an end thereof. From the spherical body portion 1102, a pair of shaft portions 1103 projects in a direction perpendicular to the opposite roller shaft 1101. On the other hand, the driving shaft 1005 (1006) is provided with an engaging portion 1104 at one end thereof, and the engaging portion 1104 is provided with a pair of slotted portions 1105. Then, the spherical body portion 1102 of the opposite roller 903 (904) is inserted into the engaging portion 1104 of the driving shaft 1005 (1006), so that the shaft portions 1103 are engaged in the slotted portions 1105. By this, the driving force from the driving shaft 1005 (1006) is transmitted to the opposite roller 903 (904).

Further, a similar constitution is provided also in a connecting portion between the driving gear 1003 (1004) and the driving shaft 1005 (1006). By the action of these connecting portions provided at two positions, the driving force from the driving gear 1002 can be reliably transmitted to the opposite rollers 903 and 904 even when the thickness of the sheet conveyed changes or even when a distance from the paper dust collecting roller 201 is changed by separation of one of the opposite rollers 903 and 904.

Further, the opposite roller 903 (904) is provided with the spherical body portion 1102 and the shaft portions 1103, and the driving shaft 1005 (1006) is provided with the engaging portion 1104 and the slotted portions 1105. However, a relationship of these portions may be reversed. That is, the opposite roller 903 (904) is provided with the engaging portion and the slotted portions, and the driving shaft 1005 (1006) is provided with the spherical body portion and the shaft portions.

As described above, when the constitution of the embodiment 3 is used, in addition to the effect described in the embodiment 1, a conveying force for conveying the sheets to the opposite rollers 903 and 904 can be imparted. For this reason, the paper dust collecting mechanism does not become resistance during the sheet conveyance, so that the sheet can be smoothly conveyed.

As described above, according to the embodiment 3, the paper dust can be effectively removed for the plurality of sheet feeding portions without causing increases in size and cost of the image forming apparatus.

Embodiment 4

[Paper Dust Collecting Unit]

An embodiment 4 will be described using FIGS. 11 and 12. Incidentally, FIGS. 11 and 12 are schematic views each showing a paper dust collecting unit 17 as viewed from a side surface. In the embodiment 4, the guiding members 312*a* and 312*b* are perforated with a hole 1201*a* which is a first hole through which the paper dust collecting roller 201 projects and a hole 1201*b* which is a second hole through which the paper dust collecting roller 201 projects, respectively. At both ends of the paper dust collecting roller 201 with respect to a rotational axis direction, an extension shaft 1202 which is a rotation shaft for rotating the paper dust collecting roller 201 extends. The image forming apparatus 100 is provided with a shaft supporting portion 1203 which is fixed to an apparatus main assembly and which supports the extension shaft 1202. The shaft supporting portion 1203 includes a pair of an inclined surface 1203*a* which is a first inclined surface and an inclined surface 1203*b* which is a second inclined surface, and these inclined surfaces 1203*a* and 1203*b* form a V-shape in cross section perpendicular to the extension shaft 1202.

The inclined surface 1203*a* and 1203*b* are provided so as to form a V-shaped cross section as shown in FIG. 11, and in a state in which the sheet is not fed from not only the sheet feeding cassette 10 but also the multi-tray 11, the extension shaft 1202 which is also a swing shaft is positioned at an acute-angle portion of the V-shape. This state in FIG. 11 is also referred to as a neutral state, and this position is also referred to as a neutral position. The neutral state can also be said as a state in which the extension shaft 1202 which is also the swing shaft contacts not only the inclined surface 1203*a* but also the inclined surface 1203*b* (i.e., contacts both the inclined surface 1203*a* and the inclined surface 1203*b*).

The paper dust collecting unit 17 in the embodiment 4 includes, similarly as in the embodiment 1, the second urging spring member 208 which is the urging means for urging the paper dust collecting roller 201 toward the merging portion 311.

The extension shaft 1202 is provided swingably along the inclined surface 1203*a* and the inclined surface 1203*b* of the shaft supporting portion 1203 fixed to the image forming apparatus 100. Incidentally, the shaft supporting portion 1203 is provided to a frame member (not shown) or the like of the apparatus main assembly of the image forming apparatus 100, but in this embodiment, only a part thereof is illustrated for explanation. Further, in FIG. 11, a conveying path of the sheet fed from the sheet feeding cassette 10 and a conveying path of the sheet fed from the multi-tray 11 are indicated by broken lines.

[Operation]

In the embodiment 4, when the sheet is not conveyed, the extension shaft 1202 is contacted to both the inclined surfaces 1203*a* and 1203*b* by the second urging spring member 208. At this time, the paper dust collecting roller 201 is, as shown in FIG. 11, in a state in which a part thereof enters both the holes 1201*a* and 1201*b*, i.e., in a state in which the paper dust collecting roller 201 projects from the paper dust collecting unit 17 side to opposite regions through the holes 1201*a* and 1201*b*. Other constitutions are similar to those in the embodiment 1, and therefore, description will be omitted.

(During Sheet Feeding from Sheet Feeding Cassette)

The case where the sheet fed from the sheet feeding cassette 10 is conveyed will be described. Part (a) of FIG. 12 is a schematic view showing an operation of the paper dust collecting unit 17 when the sheet is fed from the sheet feeding cassette 10. At this time, the sheet fed from the sheet feeding cassette 10 is conveyed along the guiding surface 207*a* of the paper dust collecting unit 17. When the sheet reaches the paper dust collecting roller 201, the sheet pushes the paper dust collecting roller 201 toward a side opposite to the hole 1201*a* by its stiffness, and therefore, the paper dust collecting roller 201 is separated from the hole 1201*a*. At this time, the extension shaft 1202 is separated from the neutral position of FIG. 11 and is moved along the inclined surface 1203*b* to a position where a force for pushing the paper dust collecting roller 201 by the sheet and an urging force of the second urging spring member 208 are balanced, and is stopped at a balanced position. The extension shaft 1202 is urged by the inclined surface 1203*b*, and the paper dust collecting roller 201 is rotated at this position, so that the paper dust collecting roller 201 causes the sheet to pass and collects the paper dust. Incidentally, the paper dust collection is similar to the paper dust collection in the embodiment 1.

(During Sheet Feeding from Multi-Tray)

Next, the case where the sheet fed from the multi-tray 11 is conveyed will be described. Part (b) of FIG. 12 is a schematic view showing an operation of the paper dust collecting unit 17 when the sheet is fed from the multi-tray 11. At this time, the sheet fed from the multi-tray 11 is conveyed along the guiding surface 207*b* of the paper dust collecting unit 17. When the sheet reaches the paper dust collecting roller 201, the sheet pushes the paper dust collecting roller 201 toward a side opposite to the hole 1201*b* by its stiffness, and therefore, the paper dust collecting roller 201 is separated from the hole 1201*b*. At this time, the extension shaft 1202 is separated from the neutral position of FIG. 11 and is moved along the inclined surface 1203*a* to a position where a force for pushing the paper dust collecting roller 201 by the sheet and an urging force of the second urging spring member 208 are balanced, and is stopped at a balanced position. The extension shaft 1202 is urged by the inclined surface 1203*a*, and the paper dust collecting roller 201 is rotated at this position, so that the paper dust collecting roller 201 causes the sheet to pass and collects the paper dust.

As described above, when the sheet 12*a* and the sheet 12*b* are not fed, the extension shaft 1202 contacts the inclined surface 1203*a* and the inclined surface 1203*b*. When the sheet 12*a* is fed, the extension shaft 1202 contacts the inclined surface 1203*b*, so that the paper dust collecting roller 201 is rotated in the arrow 404 direction in a state in which the paper dust collecting roller 201 is projected through the hole 1201*b*. On the other hand, when the sheet 12*b* is fed, the extension shaft 1202 contacts the inclined surface 1203*a*, so that the paper dust collecting roller 201 is rotated in the arrow 504 direction in a state in which the paper dust collecting roller 201 is projected through the hole 1201*a*.

When the constitution of the embodiment 4 is employed, in addition to the effect of the embodiment 1, in order to lower a resistance during the rotation of the paper dust collecting roller 201, there is no need to use a complicated mechanism for separating the guiding member and the opposite rollers. For this reason, the paper dust collecting unit 17 can be constituted simply and inexpensively.

As described above, according to the embodiment 4, the paper dust can be effectively removed for the plurality of sheet feeding portions without causing increases in size and cost of the image forming apparatus.

The above-described embodiments include the following constitutions.

(Constitution 1)

An image forming apparatus comprising:

- a first sheet feeding portion on which a first recording material is placed;
- a second sheet feeding portion on which a second recording material is placed and which is different from the first feeding portion;
- an image forming portion configured to form an image on the first recording material or the second recording material;
- a collecting portion configured to collect first paper powder deposited on the first recording material and second paper powder deposited on the second recording material;
- a merging portion where a first path and a second path cross each other, the first path being a path along which the first recording material is conveyed until the first recording material reaches the image forming portion and the second path being a path along which the second recording material is conveyed until the second recording material reaches the image forming portion;
- a rotatable member configured to collect the first paper dust while rotating in a first direction in contact with the first recording material when the first recording material is fed and configured to collect the second paper dust while rotating in a second direction opposite to the first direction in contact with the second recording material when the second recording material is fed;
- a first guiding member opposing the rotatable member and forming a part of the first path in cooperation with the rotatable member; and
- a second guiding member opposing the rotatable member and forming a part of the second path in cooperation with the rotatable member,
- wherein the collecting portion is provided downstream of the first sheet feeding portion and the second sheet feeding portion and upstream of the merging portion with respect to a conveying direction of the recording material.

(Constitution 2)

The above-described image forming apparatus, wherein the collecting portion includes a first guiding surface which is provided upstream of the rotatable member with respect to the conveying direction and which opposes the first guiding member and a second guiding surface which is provided upstream of the rotatable member with respect to the conveying direction and which opposes the second guiding member.

(Constitution 3)

The above-described image forming apparatus, wherein the collecting portion includes:

- a first sheet which is provided downstream of the first guiding surface with respect to the conveying direction at one end thereof and which is contacted to the rotatable member at the other end thereof so as to extend in a counter direction to the first direction; and
- a second sheet which is provided downstream of the second guiding surface with respect to the conveying direction at one end thereof and which is contacted to the rotatable member at the other end thereof so as to extend in a counter direction to the second direction,
- wherein when the rotatable member rotates in the first direction, the first sheet does not pass the second paper dust, collected by the rotatable member, through a side downstream of a contact portion with the rotatable member in the first direction,
- wherein when the rotatable member rotates in the second direction, the first sheet passes the second paper dust, collected by the rotatable member, through the side downstream of the contact portion with the rotatable member in the second direction,
- wherein when the rotatable member rotates in the second direction, the second sheet does not pass the second paper dust, collected by the rotatable member, through a side downstream of a contact portion with the rotatable member in the second direction,
- wherein when the rotatable member rotates in the first direction, the second sheet passes the first paper dust, collected by the rotatable member, through the side downstream of the contact portion with the rotatable member in the first direction.

(Constitution 4)

The above-described image forming apparatus, wherein the collecting portion includes a charging member contacting the rotatable member and configured to electrically charge the rotatable member by friction when the rotatable member rotates, and

- wherein the rotatable member causes the first paper dust and the second paper dust to be adsorbed thereon by an electrostatic force generated by being charged by the charging member.

(Constitution 5)

The above-described image forming apparatus, wherein the charging member scrapes off the first paper dust and the second paper dust adsorbed on the surface of the rotatable member.

(Constitution 6)

The above-described image forming apparatus, wherein the first sheet feeding portion includes a first separating member configured to separate only a single first recording material when a plurality of recording materials are stacked and fed and configured to convey the single first recording material toward a downstream side in the conveying direction, wherein the second sheet feeding portion includes a second separating member configured to separate only a single second recording material when a plurality of recording materials are stacked and fed and configured to convey the single second recording material toward a downstream side in the conveying direction, and wherein the rotatable member has a width which is a length in a direction perpendicular to the conveying direction, not less than a width of each of the first separating member and the second separating member.

(Constitution 7)

The above-described image forming apparatus, wherein the first guiding member includes a first urging portion and a first portion contacted to the rotatable member by the first urging portion, and wherein the second guiding member includes a second urging portion and a second portion contacted to the rotatable member by the second urging portion.

(Constitution 8)

The above-described image forming apparatus, further comprising contact and separation portion, wherein when the first recording material is fed, the contact and separation portion causes the first portion to contact the rotatable member and causes the second portion to separate from the rotatable member, and wherein when the second recording material is fed, the contact and separation portion causes the second portion to contact the rotatable member and causes the first portion to separate from the rotatable member.

(Constitution 9)

The above-described image forming apparatus, wherein the first guiding member includes first urging portion and a first roller contacted to the rotatable member by the first urging portion, and wherein the second guiding member includes second urging portion and a second roller contacted to the rotatable member by the second urging portion.

(Constitution 10)

The above-described image forming apparatus, further comprising a driving source configured to rotate the rotatable member in the first direction and the second direction.

(Constitution 11)

The above-described image forming apparatus, further comprising:

first transmitting portion configured to transmit a driving force of the driving source to the first roller, and second transmitting portion configured to transmit the driving force of the driving source to the second roller.

(Constitution 12)

The above-described image forming apparatus, further comprising contact and separation portion, wherein when the first recording material is fed, the contact and separation portion causes the first roller to contact the rotatable member and causes the second roller to separate from the rotatable member, and wherein when the second recording material is fed, the contact and separation portion causes the second roller to contact the rotatable member and causes the first roller to separate from the rotatable member.

(Constitution 13)

The above-described image forming apparatus, wherein the collecting portion includes a rotation shaft configured to rotate the rotatable member, wherein the first guiding member includes a first hole through which the rotatable member projects, wherein the second guiding member includes a first hole through which the rotatable member projects, wherein the image forming apparatus further comprises a shaft receiving portion fixed to the image forming apparatus and configured to receive the rotation shaft, wherein the shaft receiving portion includes a first inclined surface and a second inclined surface which form a V-shape in a cross section perpendicular to the rotation shaft, wherein when the first recording material and the second recording material are not fed, the rotation shaft contacts the first inclined surface and the second inclined surface, wherein when the first recording material is fed, the rotation shaft contacts the second inclined surface, and the rotatable member rotates in the first direction is a state in which the rotatable member projects through the second hole, and wherein when the second recording material is fed, the rotation shaft contacts the first inclined surface, and the rotatable member rotates in the second direction in a state in which the rotatable member projects through the first hole.

(Constitution 14)

The above-described image forming apparatus, wherein the collecting portion includes urging portion configured to urge the rotatable member toward the merging portion.

(Constitution 15)

The above-described image forming apparatus, wherein the rotatable member has a roller shape or a brush shape.

(Constitution 16)

The above-described image forming apparatus, further comprising:

at least one third hole feeding portion on which a third recording material is placed and which is different from the first sheet feeding portion and the second sheet feeding portion; and when the merging portion is a first merging portion, a second merging portion which is a portion where the first path and a third path along which the third recording material is conveyed until the third recording material reaches the image forming portion cross each other, wherein the second merging portion is positioned upstream of the collecting portion with respect to the conveying direction.

(Constitution 17)

The above-described image forming apparatus, further comprising conveying portion including a first rotatable member contacting print surfaces of the first recording material and the second recording material and a second rotatable member forming a nip in cooperation with the first rotatable member and configured to convey the first recording material and the second recording material to the image forming portion while nipping the first recording material and the second recording material between the first rotatable member and the second rotatable member, wherein the conveying portion includes a charging member contacting the first rotatable member and configured to electrically charge the first rotatable member by friction when the first rotatable member rotates, wherein the conveying portion is provided downstream of the merging portion and upstream of the image forming portion with respect to the conveying direction, and wherein the first rotatable member causes the first paper dust and the second paper dust to be adsorbed thereon by an electrostatic force generated by being charged by the charging member.

(Constitution 18)

An image forming apparatus comprising:

a first sheet feeding portion on which a first recording material is placed; and a second sheet feeding portion on which a second recording material is placed;

an image forming portion configured to form an image on the first recording material or the second recording material;

a conveying portion including a first rotatable member contacting print surfaces of the first recording material and the second recording material and a second rotatable member forming a nip in cooperation with the first rotatable member, wherein the conveying portion conveys the first recording material and the second recording material to the image forming portion while nipping the first recording material and the second recording material between the first rotatable member and the second rotatable member, and a merging portion where a first path and a second path cross each other, the first path being a path along which the first recording material is conveyed until the first recording material reaches the image forming portion and the second path being a path along which the second recording material is conveyed until the second recording material reaches the image forming portion, wherein the conveying portion includes a charging member contacting the first rotatable member and configured to electrically charge the first rotatable member by friction when the first rotatable member rotates, wherein the conveying portion is provided downstream of the merging portion and upstream of the image forming portion with respect to a recording material conveying direction, and wherein the first rotatable member causes paper dust to be adsorbed thereon by an electrostatic force generated by being charged by the charging member.

(Constitution 19)

The above-described image forming apparatus, wherein the first rotatable member has a width, which is a length in a direction perpendicular to the conveying direction, not less than a width of a largest recording material of recording materials capable of being conveyed by the image forming apparatus.

According to the present invention, the paper dust can be effectively removed even for the plurality of sheet feeding portions without causing increases in size and cost of the image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-107146 filed on Jun. 29, 2023, which is hereby incorporated by reference herein in its entirety.

What is claimed is:

1. An image forming apparatus comprising:

a first sheet feeding portion on which a first recording material is placed;

a second sheet feeding portion on which a second recording material is placed and which is different from the first sheet feeding portion;

an image forming portion including a transfer member forming a nip at which an image is transferred onto the first recording material or the second recording material;

a merging portion where a first path and a second path cross each other, the first path being a path along which the first recording material is conveyed toward the nip, and the second path being a path along which the second recording material is conveyed toward the nip;

a collecting portion configured to collect first paper dust from the first recording material and second paper dust from the second recording material, the collecting portion including a rotatable member configured to collect the first paper dust while rotating in a first direction in contact with the first recording material when the first recording material is fed and configured to collect the second paper dust while rotating in a second direction opposite to the first direction in contact with the second recording material when the second recording material is fed;

a first guiding member opposing the rotatable member and forming a part of the first path in cooperation with the rotatable member; and a second guiding member opposing the rotatable member and forming a part of the second path in cooperation with the rotatable member, wherein the collecting portion is provided downstream of the first sheet feeding portion and the second sheet feeding portion and upstream of the merging portion with respect to a conveying direction of the recording material.

2. An image forming apparatus according to claim 1, wherein the collecting portion includes (1) a first guiding surface which is provided upstream of the rotatable member with respect to the conveying direction and which opposes the first guiding member and (2) a second guiding surface which is provided upstream of the rotatable member with respect to the conveying direction and which opposes the second guiding member.

3. An image forming apparatus according to claim 2, wherein the collecting portion includes:

a first sheet which is provided downstream of the first guiding surface with respect to the conveying direction at one end thereof and which is contacted to the rotatable member at the other end thereof so as to extend in a counter direction to the first direction; and a second sheet which is provided downstream of the second guiding surface with respect to the conveying direction at one end thereof and which is contacted to the rotatable member at the other end thereof so as to extend in a counter direction to the second direction, wherein when the rotatable member rotates in the first direction, the first sheet does not pass the second paper dust, collected by the rotatable member, through a side downstream of a contact portion with the rotatable member in the first direction, wherein when the rotatable member rotates in the second direction, the first sheet passes the second paper dust, collected by the rotatable member, through the side downstream of the contact portion with the rotatable member in the second direction, wherein when the rotatable member rotates in the second direction, the second sheet does not pass the first paper dust, collected by the rotatable member, through a side downstream of a contact portion with the rotatable member in the second direction, and wherein when the rotatable member rotates in the first direction, the second sheet passes the first paper dust, collected by the rotatable member, through the side downstream of the contact portion with the rotatable member in the first direction.

4. An image forming apparatus according to claim 1, wherein the collecting portion includes a charging member contacting the rotatable member and configured to electrically charge the rotatable member by friction when the rotatable member rotates, and wherein the rotatable member causes the first paper dust and the second paper dust to be adsorbed thereon by an electrostatic force generated by being charged by the charging member.

5. An image forming apparatus according to claim 4, wherein the charging member scrapes off the first paper dust and the second paper dust which are adsorbed on the surface of the rotatable member.

6. An image forming apparatus according to claim 1, wherein the first sheet feeding portion includes a first separating member configured to separate only a single first recording material by frictional force when a plurality of recording materials are stacked and fed and configured to convey the single first recording material toward a downstream side in the conveying direction, wherein the second sheet feeding portion includes a second separating member configured to separate only a single second recording material by frictional force when a plurality of recording materials are stacked and fed and configured to convey the single second recording material toward a downstream side in the conveying direction, and wherein the rotatable member has a width, which is a length in a direction perpendicular to the conveying direction, not less than a width of each of the first separating member and the second separating member.

7. An image forming apparatus according to claim 1, wherein the first guiding member includes a first urging portion and a first portion contacted to the rotatable member by the first urging portion, and wherein the second guiding member includes a second urging portion and a second portion contacted to the rotatable member by the second urging portion.

8. An image forming apparatus according to claim 7, wherein when the first recording material is fed, (1) the first portion contacts the rotatable member and (2) the second portion separates from the rotatable member, and wherein when the second recording material is fed, (1) the second portion contacts the rotatable member and (2) the first portion separates from the rotatable member.

9. An image forming apparatus according to claim 1, wherein the first guiding member includes a first urging portion and a first roller contacted to the rotatable member by the first urging portion, and wherein the second guiding member includes a second urging portion and a second roller contacted to the rotatable member by the second urging portion.

10. An image forming apparatus according to claim 9, further comprising a driving source configured to rotate the rotatable member in the first direction and the second direction.

11. An image forming apparatus according to claim 10, wherein a driving force of the driving source is transmitted to the first roller and the second roller.

12. An image forming apparatus according to claim 9, further comprising a contact and separation portion, wherein when the first recording material is fed, the contact and separation portion causes the first roller to contact the rotatable member and causes the second roller to separate from the rotatable member, and wherein when the second recording material is fed, the contact and separation portion causes the second roller to contact the rotatable member and causes the first roller to separate from the rotatable member.

13. An image forming apparatus according to claim 1, wherein the collecting portion includes a rotation shaft configured to rotate the rotatable member, wherein the first guiding member includes a first hole through which the rotatable member projects, wherein the second guiding member includes a first hole through which the rotatable member projects, wherein the image forming apparatus further comprises a shaft receiving portion fixed to the image forming apparatus and configured to receive the rotation shaft, wherein the shaft receiving portion includes a first inclined surface and a second inclined surface which form a V-shape in a cross section perpendicular to the rotation shaft, wherein when the first recording material and the second recording material are not fed, the rotation shaft contacts the first inclined surface and the second inclined surface, wherein when the first recording material is fed, (1) the rotation shaft contacts the second inclined surface, and (2) the rotatable member rotates in the first direction is a state in which the rotatable member projects through the second hole, and wherein when the second recording material is fed, (1) the rotation shaft contacts the first inclined surface, and (2) the rotatable member rotates in the second direction in a state in which the rotatable member projects through the first hole.

14. An image forming apparatus according to claim 1, wherein the collecting portion includes a spring configured to urge the rotatable member toward the merging portion.

15. An image forming apparatus according to claim 1, wherein the rotatable member has a roller shape or a brush shape.

16. An image forming apparatus according to claim 1, further comprising:

at least one third hole feeding portion on which a third recording material is placed and which is different from the first sheet feeding portion and the second sheet feeding portion; and when the merging portion is a first merging portion, a second merging portion which is a portion where the first path and a third path along which the third recording material is conveyed toward the nip cross each other, wherein the second merging portion is positioned upstream of the collecting portion with respect to the conveying direction.

17. An image forming apparatus according to claim 1, further comprising a conveying portion including a first rotatable member contacting print surfaces of the first recording material and the second recording material and a second rotatable member forming a nip in cooperation with the first rotatable member and configured to convey the first recording material and the second recording material to the nip while nipping the first recording material and the second recording material by the first rotatable member and the second rotatable member, wherein the conveying portion includes a charging member contacting the first rotatable member and configured to electrically charge the first rotatable member by friction when the first rotatable member rotates, wherein the conveying portion is provided downstream of the merging portion and upstream of the nip with respect to the conveying direction, and wherein the first rotatable member causes the first paper dust and the second paper dust to be adsorbed and collected thereon by an electrostatic force generated by being charged by the charging member.

18. An image forming apparatus according to claim 17, wherein the first rotatable member has a width, which is a length in a direction perpendicular to the conveying direction, not less than a width of a largest recording material of recording materials capable of being conveyed by the image forming apparatus.

* * * * *